(12) United States Patent
Bucur et al.

(10) Patent No.: US 10,824,405 B2
(45) Date of Patent: Nov. 3, 2020

(54) LAYER-BASED CONVERSION WITH FUNCTIONALITY RETENTION

(71) Applicant: Adobe Inc., San Jose, CA (US)

(72) Inventors: Andrei Bucur, Bucharest (RO); Andrei A. G. Daniel Datcu, Prahova (RO)

(73) Assignee: ADOBE INC., San Jose, CA (US)

( * ) Notice: Subject to any disclaimer, the term of this patent is extended or adjusted under 35 U.S.C. 154(b) by 127 days.

(21) Appl. No.: 16/191,097

(22) Filed: Nov. 14, 2018

(65) Prior Publication Data
US 2020/0150935 A1 May 14, 2020

(51) Int. Cl.
G06F 17/00 (2019.01)
G06F 8/38 (2018.01)
G06F 3/0484 (2013.01)
G06T 11/20 (2006.01)
G06F 40/221 (2020.01)

(52) U.S. Cl.
CPC ............ *G06F 8/38* (2013.01); *G06F 3/04845* (2013.01); *G06F 40/221* (2020.01); *G06T 11/20* (2013.01); *G06T 2210/12* (2013.01)

(58) Field of Classification Search
None
See application file for complete search history.

(56) References Cited

U.S. PATENT DOCUMENTS

| | | | | |
|---|---|---|---|---|
| 8,170,380 B1 * | 5/2012 | Gilra | .................. | G06T 11/60 382/309 |
| 10,127,327 B2 * | 11/2018 | Bednarz, Jr. | ........... | G06F 16/986 |
| 2007/0180148 A1 * | 8/2007 | Yadidian | ............. | G06F 16/9577 709/246 |
| 2012/0249870 A1 * | 10/2012 | Senster | ................. | G06F 16/957 348/441 |
| 2017/0124746 A1 * | 5/2017 | Heynen | .................. | G09G 5/377 |
| 2019/0179885 A1 * | 6/2019 | Wong | .................... | G06F 40/154 |

OTHER PUBLICATIONS

"Working with external assets", downloaded from https://helpx.adobe.com/xd/help/working-with-external-assets.html#photoshop, Oct. 24, 2018, 10 pages.
Hall, Zac, "Adobe XD now lets you import Photoshop and Sketch assets, Illustrator and InDesign refreshed", downloaded from https://9to5mac.com/2018/03/13/adobe-xd-photoshop-sketch-import/, Mar. 13, 2018, 6 pages.

* cited by examiner

*Primary Examiner* — Mustafa A Amin
(74) *Attorney, Agent, or Firm* — F. Chau & Associates, LLC

(57) ABSTRACT

A digital image imported into a target application that provides a functionality with respect to digital images may be rendered to obtain a rendered digital image. The digital image may be parsed to obtain asset metadata characterizing the digital image. Position information identifying a position of an image element within the digital image may be used to overlay a virtual layer onto a rendition image element of the rendered digital image corresponding to the image element, within a graphical user interface (GUI) of the target application. In this way, the functionality may be provided within the GUI and with respect to the virtual layer, to thereby provide the appearance of providing the functionality with respect to the rendition image element.

19 Claims, 21 Drawing Sheets

LAYER-BASED CONVERSION WITH FUNCTIONALITY RETENTION

TECHNICAL FIELD

This description relates to converting data assets from a source application for use in a target application.

BACKGROUND

It is often desirable to convert data from one software application for use in another software application, such as when importing data from a source application to a target application. In many cases, however, it may occur that the source application supports functionalities, such as data formatting options, that are not available in the target application.

For example, a digital image that includes editable text or other editable features in a source application may not be editable when imported into a target application (which may be referred to as a loss in editing fidelity). Similarly, it may occur that text or other features imported into the target application may not look exactly the same once imported into the target application, such as when the target application does not support particular fonts or other formatting options (which may be referred to as a loss in visual fidelity).

In many cases, a given data asset within a source application may be associated with, or characterized by, asset metadata. For example, such asset metadata may include a hierarchical tree of nodes that characterizes a structure, semantics, visual aspect (e.g., color), position, or other aspect(s) of the data asset. Such asset metadata, which is often associated with editing fidelity, may also be lost during import processes. Further, users of a target application may import data for the purpose of using that data in the context of specific, native functionalities of the target application. However, if the imported data experiences a loss of editing fidelity, visual fidelity, and/or asset metadata as part of the import process, then the user will not be able to accomplish desired tasks within the target application, and/or or will experience inconvenience in doing so.

SUMMARY

According to one general aspect, a computer program product is tangibly embodied on a non-transitory computer-readable storage medium and includes instructions that, when executed by at least one computing device, are configured to cause the at least one computing device to receive a data asset of a source application, the data asset including an image element, parse the data asset to determine asset metadata characterizing the data asset, and render a rendition of the data asset, including a rendition image element corresponding to an image element of the data asset. The instructions, when executed, are further configured to determine a position of the image element within the data asset, based on the asset metadata, map a rendition image position of the rendition image element within the rendition to the position of the image element within the data asset, generate a functionality retention object associated with retaining a functionality of a target application, and provide the functionality within the target application and with respect to the functionality retention object, including providing the functionality retention object over at least a portion of the rendition image element at the rendition image position.

The details of one or more implementations are set forth in the accompanying drawings and the description below. Other features will be apparent from the description and drawings, and from the claims.

DETAILED DESCRIPTION

Figure 1:
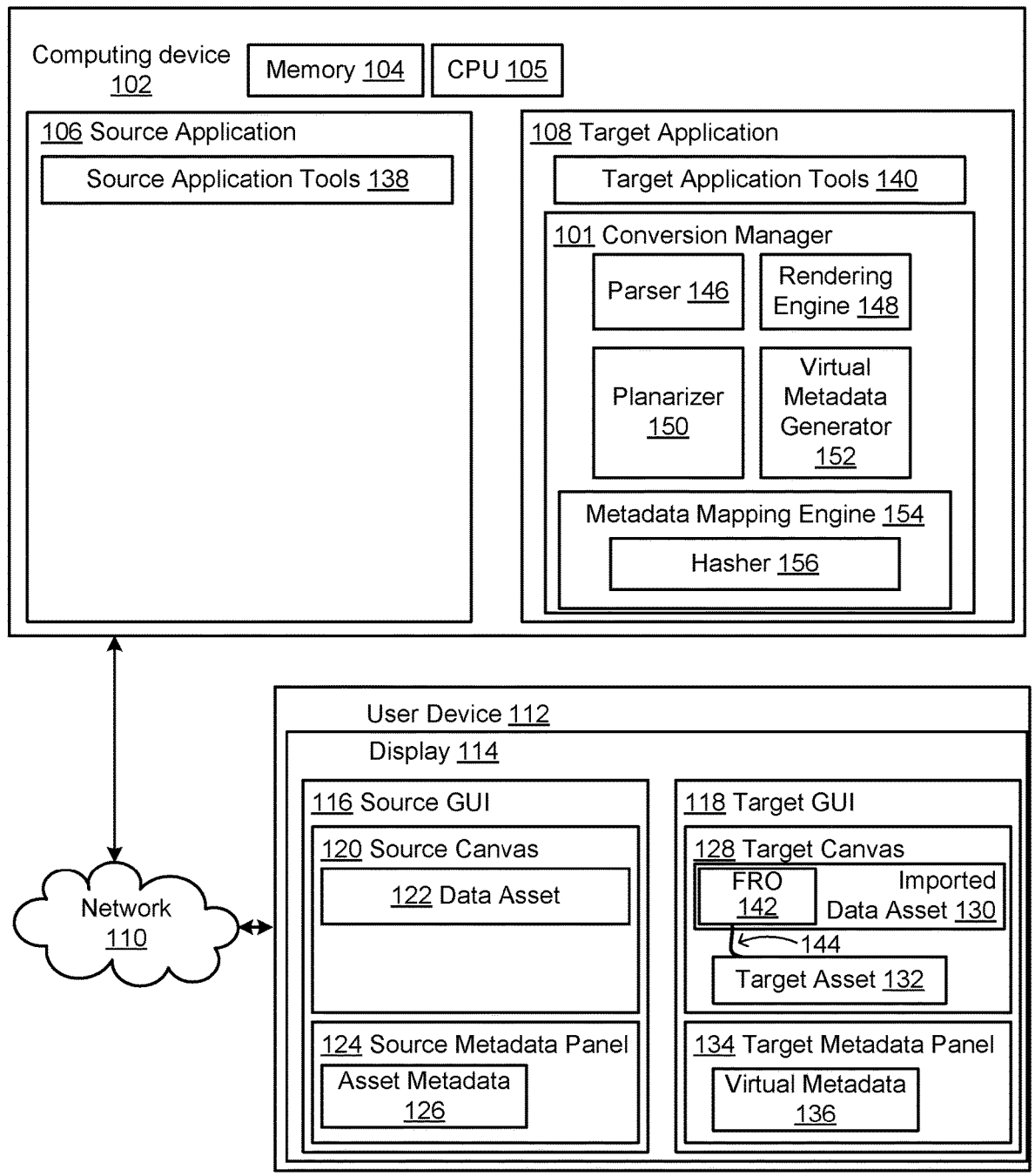
FIG. 1 is a block diagram of a system for layer-based conversion with functionality retention.

This document describes systems and techniques that provide for layer-based conversion with functionality retention. Such systems and techniques overcome technical challenges of previous systems and techniques, and improve the process(es) to perform related automated processing. For example, from within a design software application, such as a user experience design application, a digital image or other data asset may be converted while being imported, and native design functionalities of the design application may be retained, even when the imported data asset exhibits loss of editing and/or visual fidelity as part of the import process.

The described data asset import techniques utilize an efficient, fast, accurate, complete, and widely-applicable algorithm(s) for leveraging features and functionalities of a source application, without losing access to native functionalities of a target application. For example, the described techniques provide for the new computer functionality of, e.g., automatically generating functionality retention objects within the target application, and associating these functionality retention objects with an imported data asset within the target application. In this way, the retained functionality may continue to be used in the target application with respect to the functionality retention objects, and thereby with respect to the associated, imported data asset (or portion thereof). Users may continue to use the desired native functionalities of the target application with respect to imported data assets, while requiring minimal technical expertise on a part of the users, and even when the imported data asset has experienced loss of editing fidelity as part of the import process.

The systems and techniques provide a user interface within the application to enable users to execute the native functionalities of the target application using the functionality retention objects. The users may be required to have minimal or no knowledge of the operations of the functionality retention objects in order to continue using the desired native functionalities. For example, the functionality retention objects may be saved and utilized in one or more layers that are transparently layered over the underlying imported data asset.

Moreover, the described techniques may be implemented over multiple iterations of importing various data assets, without loss of earlier results of the relevant native functionalities of the target application. For example, a user may execute a first importation of a data asset into a target application from a source application, and then may use the described functionality retention objects to implement native functionalities of the target application with respect to the imported data asset. Then, at a later time, the user may execute modifications to the original data asset within the source application (e.g., using source application functionalities that are not available or accessible in the target application, such as particular digital image editing techniques). Nonetheless, using the techniques described herein, the user may import the modified data asset into the target application, while retaining the earlier results of the native functionalities that were executed with respect to the earlier-imported data asset.

Further, in many cases, an ability to retain editing or visual fidelity, asset metadata, or native functionalities, will vary between various pairs of source and target applications, and within each such pair, may vary for various types of data assets. In other words, for given source/target application pairs, an import process may include a plurality of data assets, and each such data asset may experience different levels or types of the various types of conversion-related losses, or just conversion losses, described herein.

In practice, different users in different contexts may have different priorities with respect to acceptable conversion losses. For example, some users may prioritize visual fidelity over editing fidelity, or vice-versa, while other users may place a high priority on retaining native functionalities of a target application. The described techniques provide fast and convenient options for users to select and parameterize desired import operations, to thereby provide convenient use of the relevant software applications.

Moreover, the techniques for selecting and parameterizing import operations may be executed with a high level of precision and customization. For example, a user may be provided with, and may thus select and utilize, different import options for each of a plurality of individual data assets, within a larger import operation of multiple data assets.

In this way, or using additional or alternative techniques, it is possible to execute highly customized conversion and/or import operations, while minimizing undesired conversion losses. Such import operations may be performed quickly and easily, and at large scales (e.g., a detailed complex image(s) may be imported, and/or many images may be imported together).

In specific examples of the described techniques, the source application may be a digital image editing application, and the target application may be a design tool (e.g., for prototyping or otherwise designing a website). The source application may include a data asset such as a digital image, with associated asset metadata describing the digital image (e.g., as a hierarchy, or hierarchical tree, of nodes describing groups and layers of the digital image). The target application may include native functionality, such as connecting digital images in a series in order to prototype a website design or other presentation.

The described techniques may be implemented to import the digital image for rendering as a rendition, or rendered digital image, that may include one or more of, e.g., a rasterized image, a bitmap, or a vector image. The rendition may have a high visual fidelity, and the techniques may further be implemented to generate virtual metadata for the rendition that maps to the asset metadata of the original digital image. For example, if the original asset metadata includes a hierarchical tree of nodes describing layers and other aspects of the digital image, then the virtual metadata may include a hierarchical tree of virtual nodes characterizing examples of the functionality retention objects, referenced above. The combination of the rendition with the functionality retention objects may be referred to herein as a "smart rendition," or "supplemented rendition."

For example, functionality retention objects may include "hotspots" identifying individual areas within the rendition, and such hotspots may be transparently layered over the rendition and then used to implement the native functionality of connecting images to prototype a website design. In such examples, then, the described techniques enable image imports with high visual fidelity, while retaining the native functionality of the target application of connecting such image imports (or portions thereof) for purposes of website prototyping. Further, the virtual metadata may be updated each time the original digital image is updated within, and re-imported from, the source application, so that the prototyping connections do not have to be re-done each time a modified import occurs.

Additionally, the systems and techniques described herein advantageously improve existing technology areas. For example, as described, computer-based digital image editing and website design (e.g., prototyping) are improved. Further, the systems and techniques may be used for a more automated and more efficient and faster approach to designing websites and other computer graphics.

FIG. 1 is a block diagram of a system 100 for layer-based conversion with functionality retention. In the example of FIG. 1, a conversion manager 101 is configured to provide many of the features and advantages described above, and set forth in more detail below, with respect to the remainder of FIG. 1.

In particular, as shown, the system 100 includes a computing device 102 having at least one memory 104, and at least one CPU (central processing unit) 105. The system 100 also includes at least one source application 106, and at least one target application 108.

The computing device 102 may communicate with one or more other computing devices over a network 110. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform various functions over a network.

The at least one processor (CPU) 105 may represent two or more processors on the computing device 102 executing in parallel, and utilizing corresponding instructions stored using the at least one memory 104. The at least one memory 104 represents at least one non-transitory computer-readable storage medium. Thus, similarly, the at least one memory 104 may represent one or more different types of memory utilized by the computing device 102. In addition to storing instructions, which allow the at least one processor 105 to implement the applications 106, 108 and their various components, the at least one memory 104 may be used to store data. Also, the CPU 106 may include various types and amounts of memories (e.g., buffers, caches) used to store instructions or data.

The network 110 may be implemented as the Internet, but may assume other, different configurations. For example, the network 110 may include a wide area network (WAN), a local area network (LAN), a wireless network, an intranet, combinations of these networks, and other networks. Of course, although the network 110 is illustrated as a single network, the network 110 may be implemented as including multiple different networks.

The applications 106, 108 may be accessed directly by a user of the computing device 102, at the computing device 102. In other implementations, the applications 106, 108 may be running on the computing device 102 as components of a cloud network where a user accesses the application 108 from another computing device (e.g., user device 112) over a network, such as the network 110. In some implementations, the source application 106 may be a digital image editing application, or another type of application that accesses digital image editing functionality. In other implementations, the source application 106 may be a stand-alone application that is designed to work with a digital image editing application (e.g., running on the user device 112). In still other alternatives, the source application 106 may be an application that runs, at least partially, in another application, such as a browser application.

Of course, the source application 106 may be a combination of any of the above examples, as well. Further, similar comments apply to the target application 108. For example, the target application 108, as referenced herein, may represent a website design or prototyping application. In various use cases, it may be convenient for users to construct and edit digital images within the source application 106, and then import these digital images into the target application 108 for use in designing and constructing websites or other presentations.

In the example of FIG. 1, the user device 112 is illustrated as including a display 114. The display 114 may be used to provide a source graphical user interface (GUI) 116 of the source application 106, and/or a browser application used to access the source application 106, as just referenced. Further, the display 114 is illustrated as providing a target GUI 118 of the target application 108.

The source GUI 116 is illustrated as including a source canvas 120 that is used to display a data asset 122. As just referenced, the data asset 122 may include or represent a digital image, or a document that includes text and digital image(s). More generally, the data asset 122 may include any document or other file with content that includes any available combination of text and images. Such text and images may include, e.g., computer-generated graphics (such as vector images or raster bitmaps, as described below), photographs, screenshots, and/or word processing content (e.g., text with various fonts).

Thus, the data asset 122 may include or represent relatively large quantities of information. In order to create, manipulate, and otherwise edit the data asset 122, the source GUI 116 includes a source metadata panel 124, which may be used to display asset metadata 126.

For example, as referenced, the asset metadata 126 may include information characterizing the content of the data asset 122. The asset metadata 126 may include metadata characterizing a color, font, format, effect, or other aspect of one or more individual elements of the data asset 122. The asset metadata 126 also may characterize relationships between these individual elements, such as relative sizes and positions within the larger data asset 122, including positional information along each of an x, y, and z axis for three-dimensional representations. In various examples, the asset metadata 126 may take the form of a hierarchy of layers and nodes, where the nodes represent individual and groups of content elements, such as image elements, and the layers express relative positions thereof along the z-axis. The asset metadata 126 may include, or be expressed using, a document object model (DOM) tree.

In this regard, the term "element," or "image element," and variations thereof (such as "rendered image element," or "rasterized image element"), refer to individual items or other pieces or discrete portions of content of a given image, within whatever form or format (e.g., file format) that the relevant image may have. In other words, an image element includes discrete content seen by a user, regardless of the format of the image as a whole.

For example, in many of the examples below, a navigation screen might include a 'home' button, so that the home button represents an image element of the image of the navigation screen. When the navigation screen is expressed in raster form, the home button may be referred to as a 'raster image element,' or 'rasterized image element.' More generally, any high visual fidelity rendition rendered by the rendering engine 148 of FIG. 1 may be referred to as a 'rendition image element.'

In normal operations, the user may work directly with the data asset 122 while the source application 106 automatically makes corresponding changes (e.g., edits) to the asset metadata 126. Conversely, the user may work directly with the asset metadata 126 while the source application 106 automatically makes corresponding changes to the data asset 122. The asset metadata 126 may be constructed in conjunction (concurrently) with a creation of the data asset 122, and/or may be generated after the creation of the data asset 122 (e.g., by parsing the content of the data asset 122).

Similarly, the target GUI 118 is illustrated as including a target canvas 128, which is illustrated as including an imported data asset 130 corresponding to the data asset 122. The target GUI 118 is further illustrated as including an existing target asset 132. For example, the target asset 132 generally may represent an asset created within the target application 108, or imported from the source application 106 or from some other application.

The target GUI 118 also includes a target metadata panel 134. Similarly to the source metadata panel 124 and the source canvas 120, the target metadata panel 134 may include metadata characterizing content of the target canvas 128. Such target metadata may include characterizations of existing assets and aspects of the target application 108, independently of the import techniques described herein. For example, target metadata may include metadata characterizing the target asset 132.

In FIG. 1, the target metadata panel 134 may also be used to display virtual metadata 136. As referenced above, and described in detail, below, the virtual metadata 136 may represent generated, abstracted metadata that is provided by the conversion manager 101 in conjunction with importing the data asset 122 to obtain the imported data asset 130. In this regard, then, the virtual metadata 136 may be understood to map or otherwise correspond to the asset metadata 126.

Put another way, importation of the data asset 122 may be associated with conversion losses, so that the imported data asset 130 demonstrates, for example, a loss of editing fidelity. Such conversion losses may be associated with, or expressed by, changes to the associated asset metadata 126 of the data asset 122. For example, the asset metadata 126 may characterize a shape of a visual element of the data asset 122 (e.g., a rounded rectangle), which may not be available within the target application 108. Consequently, in such scenarios, it is not feasible for the imported data asset 130 to have an editable version of the shape in question, nor is it feasible for metadata of the imported data asset to retain a reference to such an editable shape.

More generally, as shown, the source application 106 should be understood to include various source application tools 138 and associated functionality. For example, in the digital image editing examples, the source application tools 138 may include various fonts, colors, shapes, and other visual effects, along with tools to implement such effects. Meanwhile, the target application 108 generally includes target application tools 140. In examples in which the target application 108 represents a user experience design application, the target application tools 140 may contain some functionalities related to visual effects, although not generally as many as those of the source application tools 138, along with design-specific tools, such as connectors to define a sequence of screens.

Given the partial lack of overlap between the source application tools 138 and the target application tools 140, scenarios occur such as the example given above, in which the source application tools 138 easily construct a rounded rectangle, while the target application tools 140 are not able to do so. In conventional scenarios, without being able to import such image elements, it would be difficult or impossible for a user to utilize the target application tools 140, and associated native functionalities, with respect to the imported data.

Nonetheless, in FIG. 1, the virtual metadata 136 retains a reference to a functionality retention object (FRO) 142 that is generated by the conversion manager 101, as referenced above, and described below. For example, in the example scenarios in which the target application 108 is a design or prototyping tool, a connector 144 may represent a native functionality of the target application tools 140, provided for the purpose of, e.g., connecting multiple digital images in a sequence for user selection thereof.

In other words, the conversion manager 101 may generate the FRO 142 in conjunction with importing the imported data asset 130, and may utilize the virtual metadata to characterize the FRO 142. For example, when the data asset 122 includes the rounded rectangle that can not be represented in the target application 108, as referenced above, then the FRO 142 may include or represent a transparent rectangular "hotspot" that is layered over the imported data asset 130. In practice, the imported data asset 130 may include a number of such FROs 142, or hotspots, and the virtual metadata 136 may represent (and characterize) such hotspots within a virtual hierarchy.

Thus, the virtual metadata 136 may be understood to map to the asset metadata 126, where the asset metadata 126 represents, characterizes, or otherwise corresponds to, actual content (e.g., image) elements of the data asset 122, while the virtual metadata represents corresponding FROs 142 (e.g., hotspots) for at least some of the corresponding content (e.g., image) elements. In this way, as shown, the native functionality of the target application 108, represented by the connector 144 of the target application tools 140, may be executed with respect to the FRO 142, as if (from a user perspective) that native functionality is being provided with respect to the underlying rendition image element.

That is, the connecter 144 is shown as connecting to the FRO (e.g., hotspot) 142. Since, in the example, the FRO 142 is assumed to transparently overlay its corresponding rendition image element from the imported data asset 130 (i.e., the underlying rendition image element is visible to the user within the target canvas 128), the user experience of connecting the FRO 142 to the target asset 132 will be similar to a user experience of connecting the actual rendition image element underlying the FRO 142 to the target asset 132.

In the example of FIG. 1, the conversion manager 101 includes a parser 146 that is configured to parse an input, or imported, data asset, such as the data asset 122, to determine and/or construct metadata for the imported data asset 130 (e.g., rendition of the rendering engine 148). In other words, the parser 146 may attempt to determine the original asset metadata 126 of the data asset 122 from the source application 106.

For example, the parser 146 may include at least one library that is designed specifically for parsing data assets from the source application 106, or may include a plurality of libraries, each associated with one or more potential source applications. In some implementations, the parser 146 may parse an imported data asset and attempt to generate as much of the original asset metadata as possible. In other scenarios, the parser 146 may have access to some or all of the original asset metadata 126 as part of an importation process.

Meanwhile, as referenced above, the rendering engine 148 may be configured to render the imported data asset 122 as a rendition that may include, e.g., a rasterized image, a bitmap, or a vector image, or combinations thereof. In this regard, for example, it will be appreciated that a "raster image," or "rasterized bitmap," generally refers to an image that is constructed on a pixel-by-pixel basis, i.e., as an array of pixels of various colors. Such raster images are generally difficult to scale or otherwise edit.

By way of contrasting example, a "vector image," generally refers to a digital image file in which a digital image is constructed using, or defined in terms of, geometric shapes or formulas. Vector images are scalable, and can also be rotated, reflected, colorized, and otherwise edited or modified in a desired manner within the source application 106.

Thus, in conventional conversion or import processes, as described herein, it may be necessary to make decisions regarding whether to convert a given digital asset (e.g., image) in a format that is editable but may demonstrate visual fidelity losses (such as using vector images), or in a format that has high visual fidelity but demonstrates editing fidelity losses (such as a rasterized image).

In FIG. 1, the conversion manager 101 uses the parser 146 and the rendering engine 148 to initiate both of these conversion processes in parallel, so that the parser 146 provides as much asset-related metadata as possible, given available libraries, while a rendition is obtained from the rendering engine 148 in parallel. For example, as illustrated and described with respect to FIG. 3, the parser 146 may output a hierarchy of nodes and layers corresponding to image elements of the imported data asset 130.

Then, a planarizer 150 is configured to utilize the output of the parser 146 to identify a position of each such node (e.g., of each corresponding image element) within the imported data asset 122, relative to the rendition of the rendering engine 148. That is, for example, the planarizer may identify x, y, z, coordinates of each image element identified by the parser 146, with respect to the rasterized bitmap provided by the rendering engine 148.

A virtual metadata generator 152 may be configured to generate the FRO(s), such as the FRO 142, based on the positional information obtained from the planarizer 150, and to construct the virtual metadata 136 therefrom. For example, the virtual metadata generator 152 may be configured to generate synthetic layers of the FROs as virtual nodes of the virtual metadata 136.

In specific examples, as referenced above and described below, the FRO 142 may represent a transparent bounding box identifying a "hotspot" within the imported data asset 130. In other words, as may be appreciated from the above description, the imported data asset 130 may include a rendition, such as a rasterized bitmap, from the rendering engine 148, while the FRO 142 may represent a transparent bounding box that is overlaid on the rendition. Accordingly, as referenced above, and in the below description, the imported data asset 130 with the FRO 142, and associated with the virtual metadata 136, may be referred to as a "smart rendition," or "supplemented rendition," because a rendition is provided with high visual fidelity while still providing access to native functionalities of the target application 108 (such as the connector 144).

A metadata mapping engine 154 may be configured to map the virtual metadata to the asset metadata, and/or to the data asset 122 within the source application. For example, as referenced above, the data asset 122 may include a rounded rectangle that is imported, rendered as a rasterized bitmap, and overlaid with a layer that includes the FRO 142 (e.g., rectangular hotspot). Then, a hash generator 156 may be configured to assign a hash identifier to the data asset 122, to define the data asset 122 uniquely within the context of FIG. 1 operations.

At a later time, the user, having connected the FRO 142 using the connector 144 to the target asset 132, may wish to obtain some result with respect to the rounded rectangle within the target application 108. Since the rounded rectangle has been rendered as a rasterized bitmap, it is not feasible for the user to edit the rounded rectangle directly within the target application 108.

Nonetheless, the user may easily make any desired edits to the original data asset 122 within the source application 106, using source application tools 138, such as changing a color of the data asset 122. Then, in conjunction with re-importing the updated (e.g., colorized) data asset 122, the metadata mapping engine 154 may utilize the previously-assigned hash identifier to determine that the newly-imported rounded rectangle corresponds to the previously-identified rounded rectangle. For example, the hash generator 156 may generate a new hash identifier based on the updated data asset, and then the metadata mapping engine 154 may match the two hash identifiers to determine equivalence of the original and updated data asset 122.

Accordingly, the FRO 142 may be maintained with respect to the updated (colorized) version of the imported data asset 130. In this way, the connector 144 may be maintained with respect to providing its intended function of connecting the rounded rectangle within the imported data asset 130 to the target asset 132.

In the example of FIG. 1, the conversion manager 101 is illustrated as being included within the target application 108. In this regard, the various conversion operations of the conversion manager 101 may be understood to be associated with import operations of the target application 108, such as when copying data assets from the source application to a conventional clipboard (not shown in FIG. 1) of the computing device 102, and then pasting the data assets to the target application 108. In other implementations, however, the conversion manager 101 may be executed separately from the target application 108, such as when the conversion manager 101 is used as a stand-along application for a plurality of source/target applications.

Further, the conversion manager 101 may include various other functionalities than those discussed in detail with respect to FIG. 1. For example, FIGS. 17-21 provide examples of operations of the conversion manager 101 in converting the data asset 122 into the imported data asset 130, in which the conversion manager 101 makes intelligent decisions regarding available conversion processes for each content element/node being imported. For example, the conversion manager 101 may determine whether to import an editable image as an editable imported image, or as a non-editable, rasterized bitmap, or, as in the examples described herein, as a smart rendition in which the virtual metadata 136 of FRO(s) 142 are available.

Figure 2:
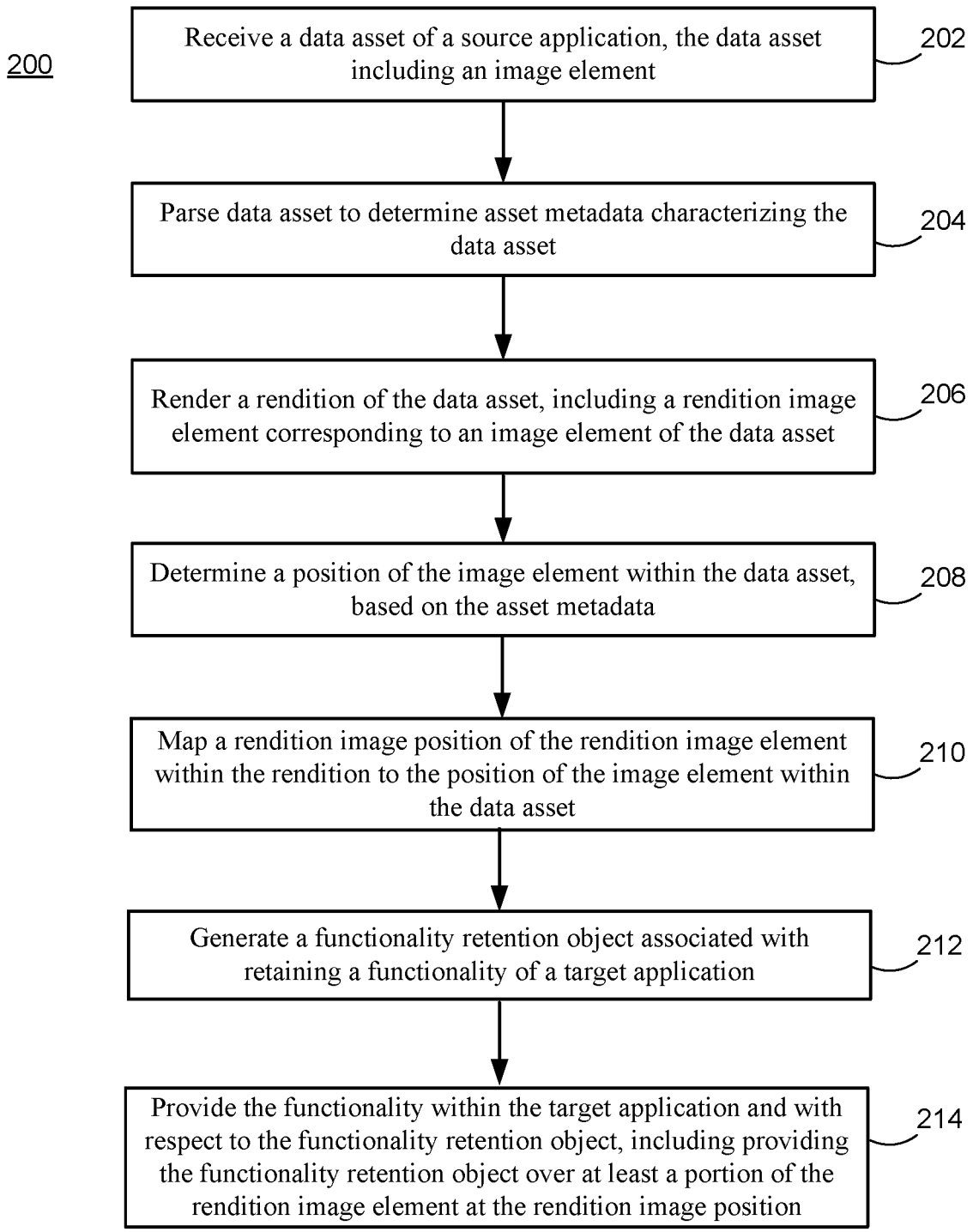
FIG. 2 is a flowchart illustrating example operations of the system of FIG. 1.

FIG. 2 is a flowchart 200 illustrating example operations of the system 100 of FIG. 1. In the example of FIG. 2, operations 202-214 are illustrated as separate, sequential operations. However, it will be appreciated that, in various implementations, additional or alternative operations or sub-operations may be included, and/or one or more operations or sub-operations may be omitted. Further, it may occur that any two or more of the operations or sub-operations may be executed in a partially or completely overlapping or parallel manner, or in a nested, iterative, looped, or branched fashion.

In the example of FIG. 2, a data asset of a source application may be received, the data asset including an image element (202). For example, the conversion manager 101 may receive the data asset 122 upon importation thereof from the source application 106. As described, the data asset 122 may include any document or file that includes any type of digital image. The included digital element may include virtually any content or portion of the digital image. For example, individual digital elements, or aspects thereof, may be referenced and characterized using the asset metadata 126.

The data asset may be parsed to determine asset metadata characterizing the data asset (204). For example, the parser 146 may include, or have access to, a library configured to parse documents from an application corresponding to that library. For example, where the asset metadata 126 includes an object hierarchy, the library is configured to re-build that same tree structure, e.g., by visiting the tree on a node-by-node basis, and outputting the metadata information for each node.

A rendition of the data asset may be rendered, including a rendition image element corresponding to an image element of the data asset (206). For example, the rendering engine 148 may be configured to render a rasterized version (or other suitable type of rendition) of the imported digital image. In such examples, as described, the rasterized version will have high visual fidelity, with limited or no editing ability.

A position of the image element within the data asset may be determined, based on the asset metadata (208). For example, the planarizer 150 may be configured to determine x, y, z coordinates of the digital image element within the digital image. In particular, to the extent that the digital image includes or represents 3-dimensional layers and the image element is contained within one of the layers, the planarizer 150 may specify the layer (in the z-direction, i.e., relative to the z-positioning of the other layers) of the image element.

A rendition image position of the rendition image element within the rendition may be mapped to the position of the image element within the data asset (210). For example, the virtual metadata generator 152 may be configured to map the determined coordinates of the image element within the parsed digital image to corresponding coordinates of the rendition.

A functionality retention object associated with retaining a functionality of a target application may be generated (212). For example, the virtual metadata generator 152 may be configured to generate the FRO 142 of FIG. 1, including the type of 'hotspot' referenced above, which is configured to receive the connector 144 as an example of the retained functionality of the target application tools 140.

The functionality may be provided within the target application and with respect to the functionality retention object, including providing the functionality retention object over at least a portion of the rendition image element at the rendition image position (214). For example, the virtual metadata generator 152 may be configured to overlay the FRO 142 within a portion of the imported data asset 130 of FIG. 1. In practice, as described and illustrated below, the FRO 142 may be transparent, and may be partially or completely non-visible to a viewer of the target GUI 118. Therefore, from a point of view of the viewer, connectors or other retained functionalities of the target application 108 may appear to be performed directly with respect to the underlying (rendition) image element.

Further, the generated FRO 142 may be represented within virtual metadata 136, including being named after the underlying rendition image element. Therefore, again, the user may interact with the virtual metadata based on the name of the image element, in a manner that is congruent with normal operations of the target application 108.

Figure 3:
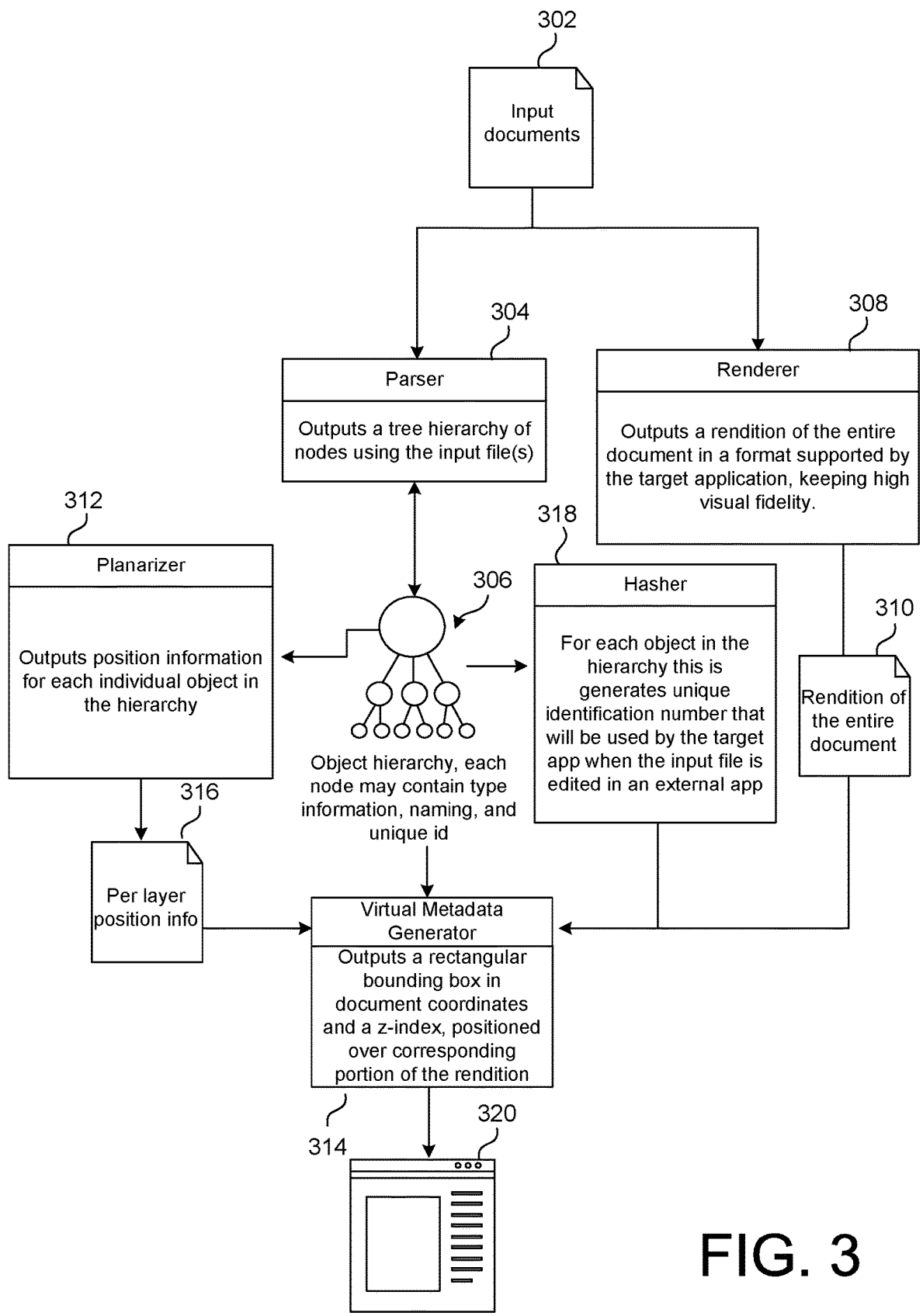
FIG. 3 is a block diagram illustrating a more detailed example implementation of the system of FIG. 1.

FIG. 3 is a block diagram of a more detailed example implementation of the system 100 of FIG. 1. Specifically, FIG. 3 provides more detailed example operations of the above-described scenarios in which the source application 106 represents a digital image editing application, while the target application 108 represents a user experience design application for designing websites, presentations, and other user experience interfaces. For example, the source application 106 may represent a digital imaging application such as Adobe Photoshop®, or Adobe Illustrator®, while the target application 108 may represent a design application, such as Adobe XD®.

For example, a user who wants to create a website prototype will import buttons, navigation menus, text, and pictures, and then, using the design application's prototyping features, will build the website by connecting the various assets together. In the final prototype provided in such scenarios, users will then be able to click on the particular asset, such as a contact button, to move to another page of the website being designed, such as a map page.

In FIG. 3, an input document 302 is received. The input document 302 may include various combinations of text and digital images, including vector graphics, raster images, outlines, photographs, and various other types of content.

A parser 304, corresponding to the parser 146 of FIG. 1, is configured to output a tree hierarchy of nodes, based on the input document 302. In FIG. 3, the output tree hierarchy is illustrated as an example object hierarchy 306. An example node of the object hierarchy 306 is illustrated and described below, with respect to FIG. 4.

In parallel, a rendering engine 308, corresponding to the rendering engine 148 of FIG. 1, may be configured to output a rendition of some or all of the input document 302. The rendering engine 308 may utilize a format(s) that is fully supported by the target application 108, and that thereby maintains maximum-available visual fidelity. For example, such rendition formats may include the portal document format (pdf), and/or as a rasterized bitmap. FIG. 3 illustrates an output of the rendering engine 308 as rendition 310.

A planarizer 312, corresponding to the planarizer 150 of FIG. 1, may be configured to examine the object hierarchy 306, and provide positional information for each corresponding element, layer, or node, including x, y, z coordinates thereof.

A virtual metadata generator 314, corresponding to the virtual metadata generator 152 of FIG. 1, may be configured to use the positional information provided by the planarizer 312 to generate rectangular bounding boxes for each of the positionally-identified elements of the object hierarchy 306, and to connect the generated bounding boxes into the virtual metadata 316, corresponding to the virtual metadata 136 of FIG. 1.

Accordingly, a smart rendition 320 corresponding to the input document 302 may be constructed. As described above with respect to FIG. 1, the smart rendition 320 provides all the advantages of the high visual fidelity of the rendition 310, while also providing the virtual metadata 316, including the generated rectangular bounding boxes. In this way, as described, the smart rendition 320, including the generated rectangular bounding boxes thereof, may be used to retain and implement native functionalities of the target application 108, including, e.g., establishing connectors between the generated rectangular bounding boxes and any desired, available target assets of the target application 108, such as the target asset 132.

The techniques of FIG. 3 may be useful, for example, in scenarios in which design applications are used to import external graphical assets to allow users to use existing artwork, such as icons or stock images, for quick prototyping of workflows and other uses. The various imported assets may be available in multiple formats, which may be, to some extent, incompatible with the target application tools 140 of the target application 108.

The system of FIG. 3 provides solutions that improve or maximize user experiences in scenarios in which the imported formats are partially or completely incompatible with the target application 108. The rendition 310 preserves maximum visual fidelity, without impeding the prototyping efforts of the user.

Further, a hasher 318, corresponding to the hasher 156 of FIG. 1, may be utilized to provide seamless updates, in which the user is provided with an ability to edit previously-imported assets within the source application 106. In such cases, the rendition(s) corresponding to the smart rendition 320, may be automatically updated within the target application 108 to incorporate the edited version of the original digital image, thereby maintaining the user's previously-designed prototyping information, even when the edited digital image includes image elements that have been re-positioned or otherwise altered.

Specifically, for example, the hasher 318 may be configured to generate a unique identification number for each object in the object hierarchy 306, e.g., in conjunction with importing the corresponding input document 302. The target application 108, e.g., the metadata mapping engine 154 of FIG. 1, may be configured to match the unique identification number among multiple versions of the object hierarchy 306 (that is, over multiple iterations of import operations of updated versions of the input document 302), to thereby maintain a relationship between each unique object in a corresponding rectangular bounding box.

In more detailed example implementations, the parser 304 should be understood to be configured to analyze the entire input document 302 to provide the object hierarchy 306 with as much semantical information as possible, given the library that may be available to the parser 304 for the source application 106. To some degree, the target application 108 may be capable of using the object hierarchy to construct internal nodes for display to the user, as described below with respect to FIGS. 5 and 17-21. In the scenarios described herein, however, the object hierarchy 306 will contain information that the target application 108 is not able to represent. For example, in the examples referenced above in which the source application 106 is Adobe Photoshop® (so that the input document 302 is in the .psd format), a parser of Adobe XD® as the target application 108 will be incapable of representing all shape information that may be included within the object hierarchy 306.

Meanwhile, the rendering engine 308 may be configured to provide a simplistic, flat representation of the input document 302, while maintaining as much visual accuracy as possible within the output rendition 310. Continuing the example above, the rendering engine 308 may output the rendition 310 as a raster bitmap image of the input document 302, or portions thereof. Since Adobe XD® supports raster images, the rendition 310 may be displayed accurately, even though the rendition 310, by itself, will have lost semantical information that is included in the object hierarchy 306. Consequently, when considering the rendition 310 by itself, the rendition 310 would not be editable within Adobe XD®, and elements thereof would not be usable as individual assets in prototyping workflows within Adobe XD®, since the user would only be able to select the entire image of the rendition 310 as a mouse click interaction source.

Figure 4:
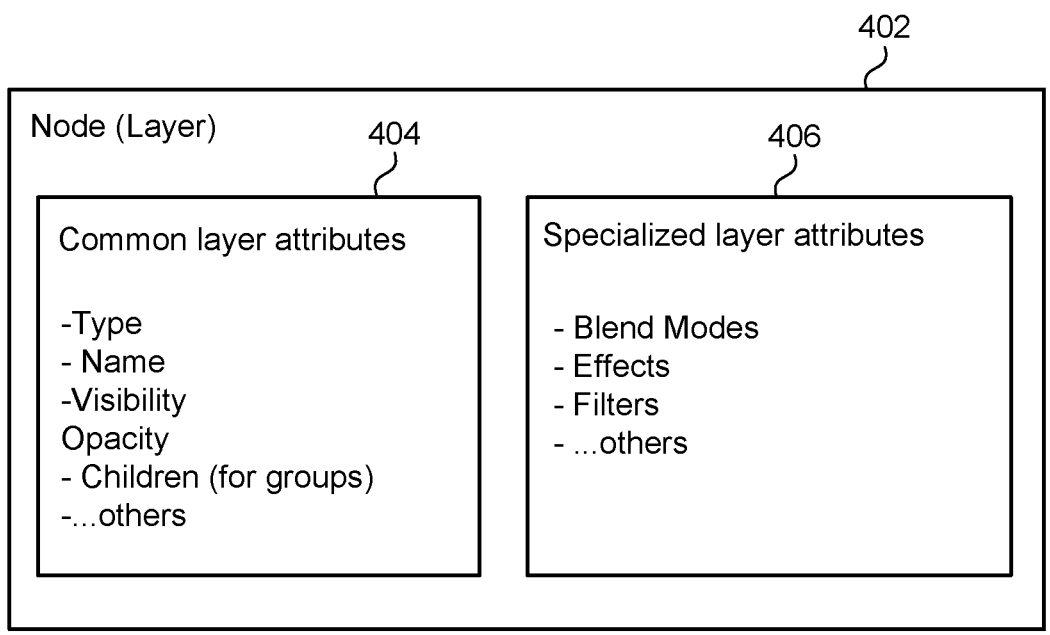
FIG. 4 is a block diagram of an example layer that may be used in the systems of FIGS. 1 and 3.

With respect to the semantical information included in the object hierarchy 306, FIG. 4 provides a block diagram illustrating an example node or layer 402 that may be included within the object hierarchy 306. In the example of FIG. 4, the node or layer 402 may be included within a document object model (dom) of the input document 302, e.g., as a data structure with attached attributes, such as meta information, or presentation attributes.

In the specific example of FIG. 4, the node or layer 402 includes example layer attributes 404, such as a type, name, visibility, or opacity, as well as identifiers of child nodes, when a given layer includes a group. Further in FIG. 4, additional, specialized layer attributes 406 may be included, such as blend mode, effects, and filters.

Figure 5:
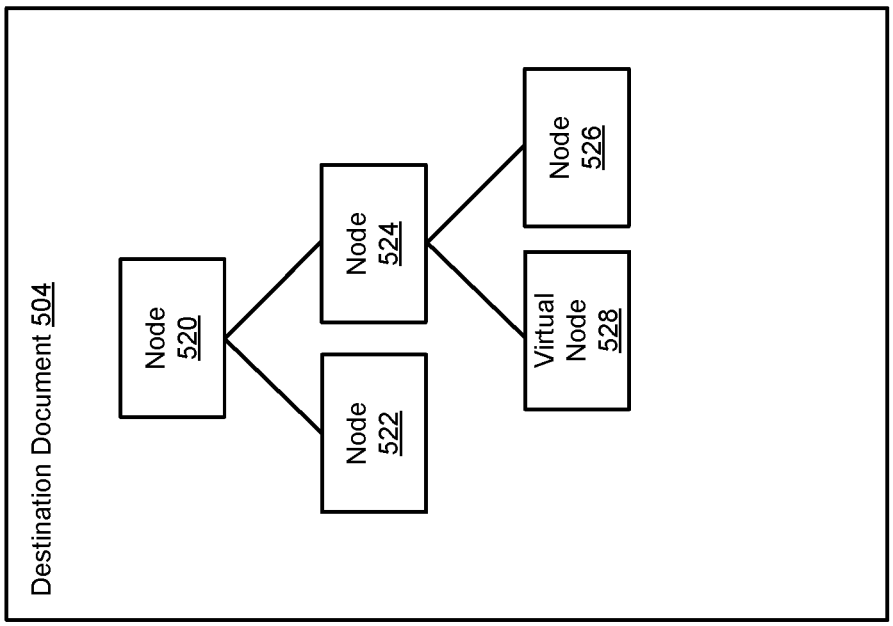
FIG. 5 is a block diagram illustrating a conversion process that may be implemented using the systems of FIGS. 1 and 3.
Figure 5:
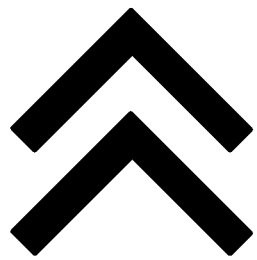
Figure 5:
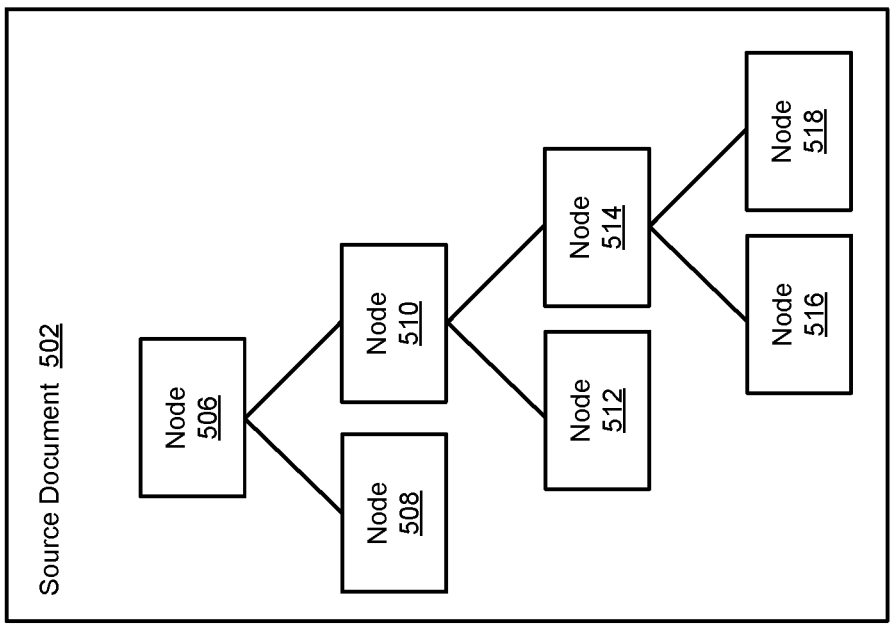

FIG. 5 is a block diagram illustrating an overall conversion process that may be executed using the system of FIG. 3. In the example of FIG. 5, a source document 502, corresponding generally to the input document 302 of FIG. 3, or the data asset 122 of FIG. 1, is represented using an object hierarchy, corresponding to the object hierarchy 306, or the asset metadata 126 of FIG. 1.

In the simplified example of FIG. 5, the source document 502 includes a plurality of nodes 506, 508, 510, 512, 514, 516, and 518. In practice, during a conversion process such as illustrated in FIG. 5, some of the attributes 404, 406 of FIG. 4, associated with the various nodes 506-518 of the source document 502, may be mapped directly from the source document 502 to a destination format of a converted, destination document 504. Some of the nodes 506-518 may be partially converted, such as with visual or editing fidelity loss (e.g., layers may lose any advanced typography that may be included in the source document 502). Finally, some nodes will be incapable of being converted to the destination format of the destination document 504, at all. Consequently, in FIG. 5, the destination document 504 is illustrated as including nodes 520, 522, 524 that correspond directly and completely to nodes 506, 508, 510, respectively. Meanwhile, a node 526 corresponds to a partial conversion of some of the nodes 514, 516, 518.

Further, a virtual node 528 corresponds to the node 512, and represents an example of the virtual metadata 136 of FIG. 1. That is, for example, the virtual node 528 may represent scenarios in which the techniques of FIGS. 1-3 are used to generate a rasterized image with overlaid hotspots providing retained functionalities of a target application of the destination document 504.

In other words, as referenced above and described in detail below with respect to FIGS. 17-21, the conversion process of FIG. 5 may be implemented using the systems of FIG. 1 or 3, in a manner that makes intelligent choices with respect to available conversion operations, and dependent upon user preferences.

For example, for nodes of the source document 502 that cannot be converted or can only be partially converted, for use in the destination document 504, the systems of FIGS. 1 and 3 (e.g., the conversion manager 101) may be configured, for each such node, to select between, e.g., minimizing the loss of editing fidelity, minimizing the loss of visual fidelity, or generating a smart bitmap as described herein. Such conversion decisions may be executed automatically, as described herein, and/or may be implemented or updated based on user feedback.

Figure 6:
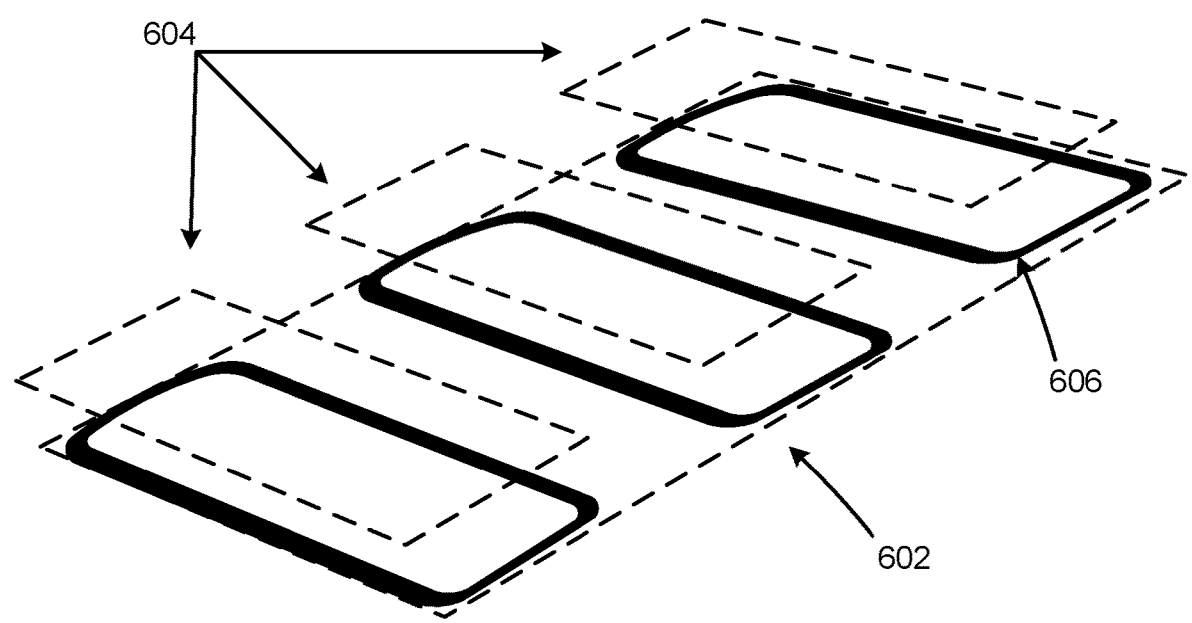
FIG. 6 is a block diagram illustrating an example of a smart bitmap that may be utilized in the systems of FIGS. 1 and 3.

FIG. 6 is a block diagram illustrating an example output of the system of FIG. 3. In FIG. 6, a rasterized bitmap 602 represents an example of the rendition 310 of FIG. 3, provided by the rendering engine 308. Meanwhile, a synthetic layer 604 includes rectangular bounding boxes in a layer above, and lying directly over, original rounded rectangles 606 of the underlying bitmap layer 602.

As described above, to obtain the synthetic layer 604, the planarizer 312 of FIG. 3 is configured to utilize the object hierarchy 306 to provide positional information of individual nodes of the object hierarchy 306 relative to the rendition 310.

In the example of FIG. 6, the planarizer 312 would thus identify positional information of the rounded rectangles 606 of the layer 602, including the coordinate information in scenarios in which the described elements overlap, or are otherwise positioned along a z axis with respect to one another.

The virtual metadata generator 314 of FIG. 3 may thus utilize the positional information of the planarizer 312 with respect to the rendition 310, to thereby generate the example synthetic layer 604 of FIG. 6. Specifically, the virtual metadata generator 314 may be configured to identify an axis-aligned minimum bounding box, such as a rectangle having a smallest-possible area within which its underlying element will fit completely. In other examples, the bounding box may be somewhat smaller or larger than its underlying image element.

It will be appreciated from the above description of FIG. 1 that the resulting rectangular bounding boxes of the example synthetic layer 604 represent examples of the FRO 142 of FIG. 1, and may be constructed with a tree-like hierarchy that corresponds to the original hierarchy 306. Consequently, the resulting tree-like hierarchy can be displayed within a corresponding panel of the target application in question, such as the target metadata panel 134 of FIG. 1.

In practice, the example layer 604 may be locked within the target application, such as within the target canvas 128 or the target metadata panel 134 of FIG. 1, so that the user has only a limited ability to alter properties thereof. Nonetheless, as described with respect to FIG. 1, the user will be able to use the synthetic layer 604 to implement retained functionalities of the target application 108, such as adding the example prototype interaction 144 in FIG. 1, or other interactions or functionalities. Consequently, it will appear to the user that such functionalities are being performed with respect to the underlying rounded rectangle 606.

Figure 7:
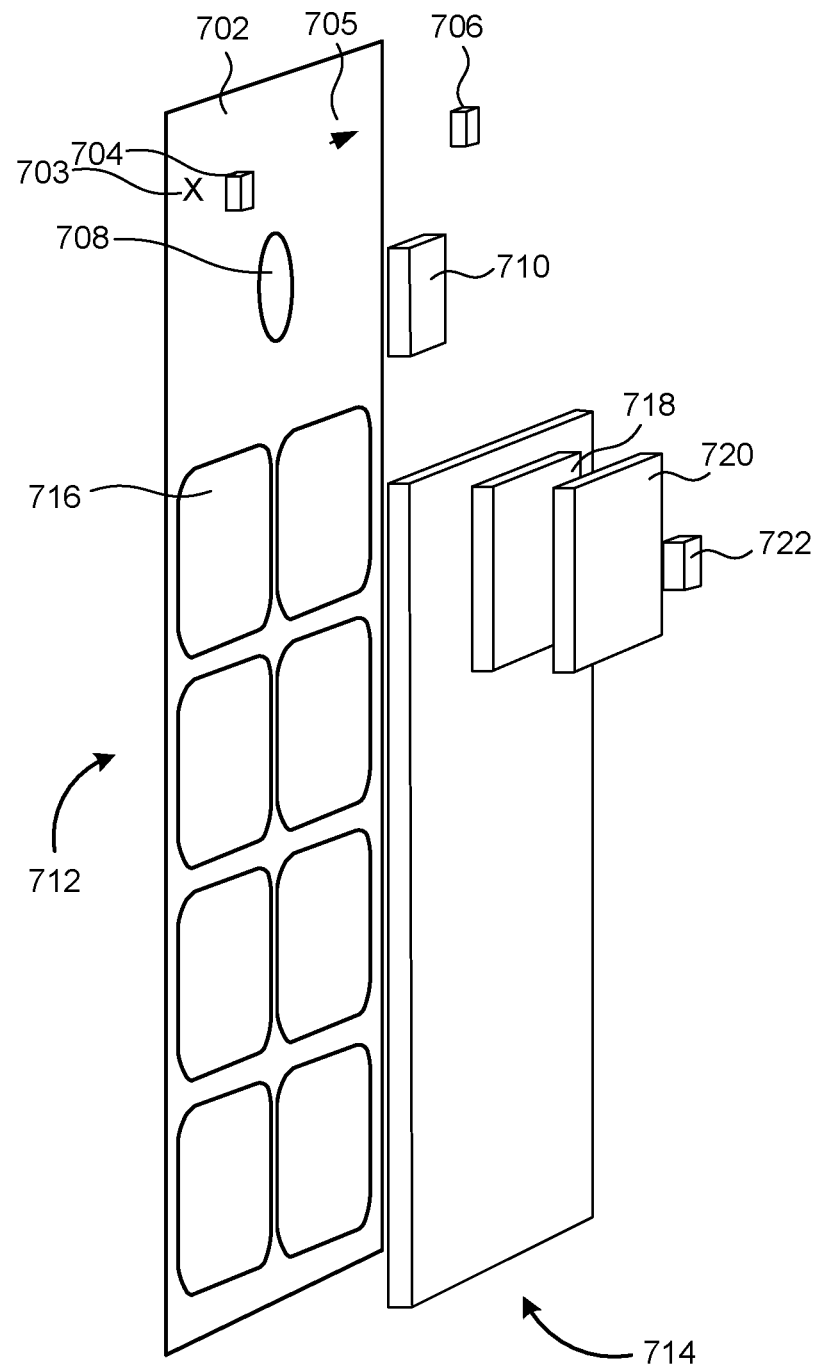
FIG. 7 is a 3D view of a more detailed example of the smart bitmap of FIG. 6.

FIG. 7 illustrates a more detailed example of FIG. 6, using an example image that is also used as a basis for example implementations illustrated with respect to FIGS. 8, 11-16, 19, and 20. In particular, FIG. 7 illustrates a 3D view of a smart bitmap corresponding to the examples of the imported data asset 130 of FIG. 1, and the smart bitmap 320 of FIG. 3.

In the example, an image 702 represents a rasterized bitmap (although other renditions are possible, as described herein) of an original image of a navigation screen of an application being designed, which includes a number of image elements. Specifically, as shown, the raster image 702 includes a close or "X" button 703, a logout button 705, an individual avatar 708, and a plurality of selection buttons 712.

As also illustrated, each of these example elements of the raster image 702 may be provided with corresponding hotspots or functionality retention objects (FROs), represented in FIG. 7 as various, corresponding rectangular bounding boxes. Specifically, the close or "X" button 703 has a bounding box 704, the "logout" button 705 has a bounding box 706, and the avatar 708 has a bounding box 710.

The buttons 712 have a bounding box 714 that corresponds to an entirety of the illustrated eight buttons. Further, each individual button, such as the button 716, may be associated with its own bounding box or boxes. For example, as shown, the button 716 may have a background with a bounding box 718, with its rounded rectangle outline being associated with a bounding box 720, while text within the button 716 may have its own bounding box 722.

Figure 8:
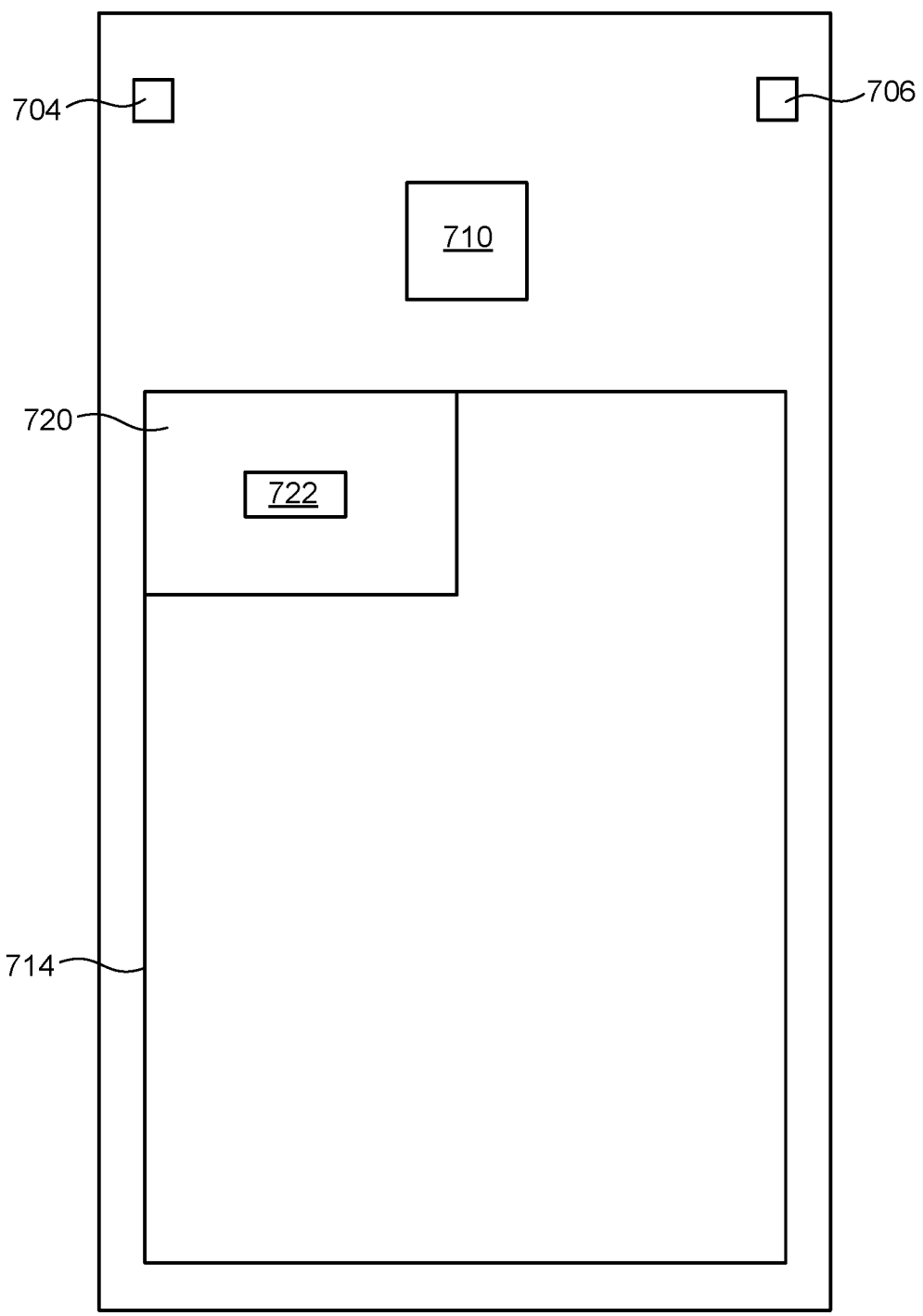
FIG. 8 is a 2D view of the 3D view of FIG. 7.

FIG. 8 illustrates a 2D front view of the example of FIG. 7. As may be appreciated, a 2D representation may not include as much information as the 3D presentation of FIG. 7. However, all of the information of FIG. 7 may of course be retained within corresponding virtual metadata. Specifically, all of the various virtual nodes (bounding boxes) of FIG. 7 may be incorporated into a virtual hierarchy, as shown and described below with respect to FIG. 10.

Figure 9:
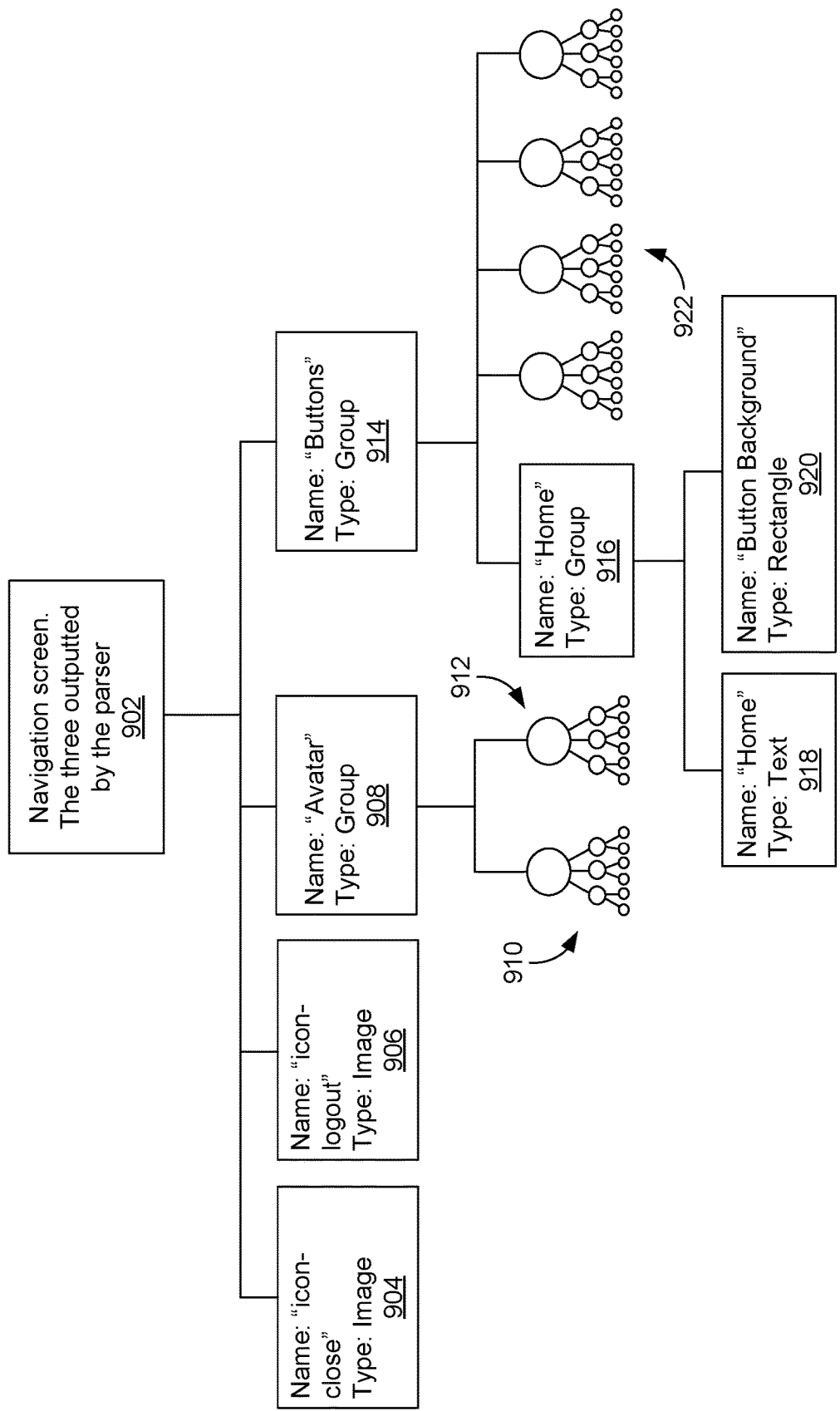
FIG. 9 is an example of a hierarchy of nodes that may be utilized in the examples of the systems of FIGS. 1 and 3, and corresponding to the views of FIGS. 7 and 8.

FIG. 9 illustrates an example of the object hierarchy 306 of FIG. 3, with respect to the example of FIGS. 7 and 8. In other words, FIG. 9 illustrates an example output of the parser 304, with respect to an original digital image of the navigation screen 702 from FIG. 7.

Thus, in FIG. 9, a source node 902 identifies the navigation screen of FIG. 7 as the image for which the object hierarchy of FIG. 9 is constructed. A node 904 corresponds to the close or "X" button 703 of FIG. 7, while a node 906 corresponds to the logout icon 705. A node 908 refers to the avatar 708 of FIG. 7. As shown, the node 908 may have sub-hierarchies 910, 912, which may characterize various visual effects or other attributes of the avatar 708.

A node 914 refers to the buttons 712 of FIG. 7. As shown in FIG. 9, each button, such as a "home" button 716, may have a corresponding node, such as the home node 916. As with the nodes 908, 914, the home node 916 may also be a group node, having a sub-node 918 for text, and a sub-node 920 for shape (e.g., rectangle). In other words, the sub-nodes may correspond to the elements of the button 716 of FIG. 7 for which the bounding boxes 718, 720, 722 are designated.

Although not specifically illustrated or labelled in the simplified example of FIG. 9, remaining buttons of the button 712 of FIG. 7 may also be included. As shown, such buttons may have corresponding sub-hierarchies 922 within the larger object hierarchy of FIG. 9.

Figure 10:
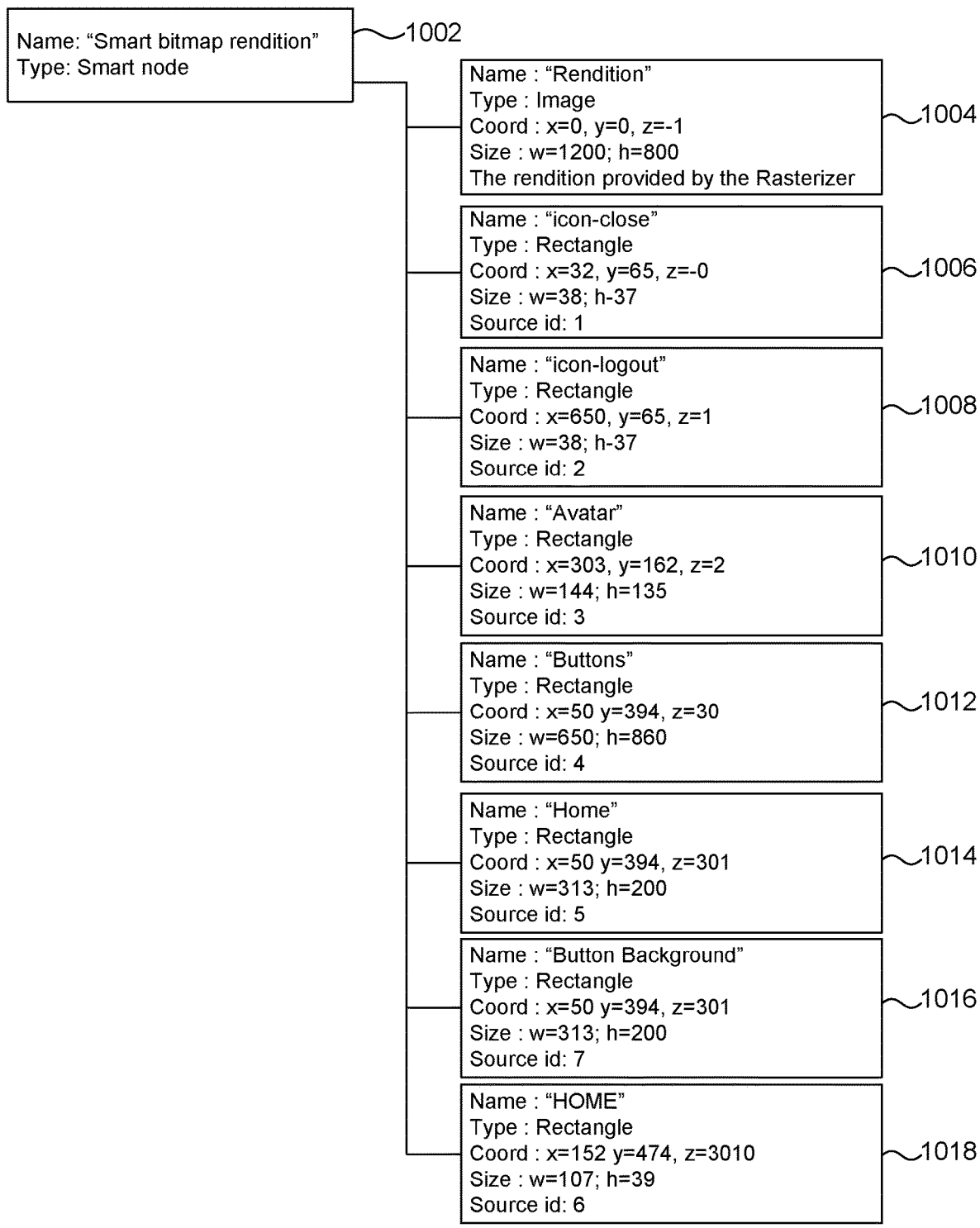
FIG. 10 is a block diagram illustrating virtual metadata characterizing the smart bitmap of FIGS. 7 and 8.

FIG. 10 is a block diagram of an example of virtual metadata 136 of FIG. 1, with respect to the examples of FIGS. 7-9. Specifically, as shown, a node 1002 represents a parent node for a smart bitmap rendition of the example of FIGS. 7-9.

As further shown in FIG. 10, a node 1004 provides a node referencing the rasterized rendition of the original image of the navigation screen of FIG. 7, such as may be output by the rendering engine 308. Meanwhile, a node 1006 corresponds to the close or "X" icon 703 of FIG. 7 and associated rectangle bounding box 704, including associated coordinate and size information. The node 1006 also includes a source ID, such as a source identifier that may be generated by the hashing engine 318 of FIG. 3.

Similar comments apply to a node 1008 corresponding to the logout icon 705 and its rectangular bounding box 706, a node 1010 corresponding to the avatar 708 and its corresponding rectangular bounding box 710, and a node 1012 corresponding to the button 712 of FIG. 7 and their corresponding rectangular bounding box 714.

Similarly, a node 1014 corresponds to the home button 716 and its rectangular bounding box 720, as well as a node 1016 corresponding to a background image of the home button 716, and its rectangular bounding box 718. Finally in FIG. 10, a node 1018 corresponds to the text "home" of the home button 716, and its corresponding rectangular bounding box 722.

As may be appreciated from the above description of FIGS. 1-3, the information included within the various nodes 1002-1018 may be obtained from various available sources. For example, the names of the nodes may be obtained from the parser 304, while the position information may come from the planarizer 312. The rectangular shape of the bounding boxes may be obtained from the virtual metadata generator 314, while the unique identifiers may be obtained from the hasher 318.

Figure 11:
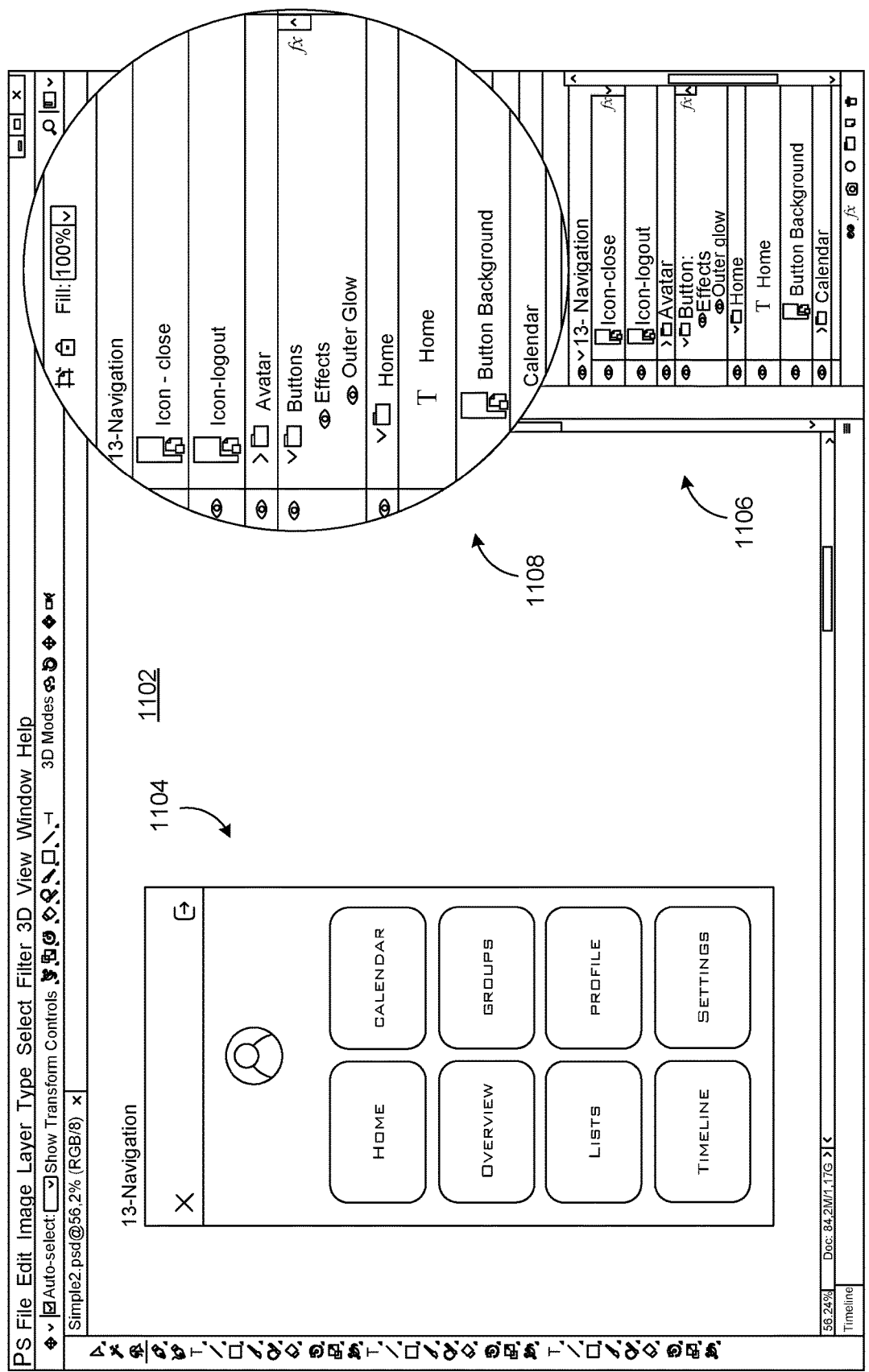
FIG. 11 is a first example screenshot of a source application of FIG. 1.

FIG. 11 is a screenshot illustrating a first example of the source GUI 116 of FIG. 1. As shown, a source canvas 1102 of FIG. 11 corresponds to the source canvas 120 of FIG. 1, and contains the image 1104 of the navigation screen 702 of FIG. 7, which thus corresponds to the data asset 122 of FIG. 1 (or the input document 302 of FIG. 3). FIG. 11 illustrates example names for each of the buttons (that is, buttons 712 in FIG. 7, not individually labelled there).

Further in FIG. 11, a source metadata panel 1106 corresponds to the source metadata panel 124 of FIG. 1, and includes an object hierarchy 1108 for the navigation screen 1104 that corresponds to the asset metadata 126 of FIG. 1. Thus, it will be appreciated that the object hierarchy 1108 of FIG. 11 corresponds to the navigation screen 1104, and includes hierarchy information that would need to be recreated, to the extent possible, by a parser within a target application, a described above with respect to FIGS. 1 and 3, in order to obtain fully-editable version of the navigation screen 1104 within the target application 108.

However, for the sake of the examples of FIGS. 11-16, it may occur that the hierarchy 1108 includes effects that may not be available for inclusion within the target application 108. For example, within the object hierarchy 1108, the various buttons of the navigation screen 704 are illustrated as having effects including "outer glow," which may not be available for, or supported by, the target application 108 in question (as referenced in more detail below, with respect to FIGS. 19, 20).

Figure 12:
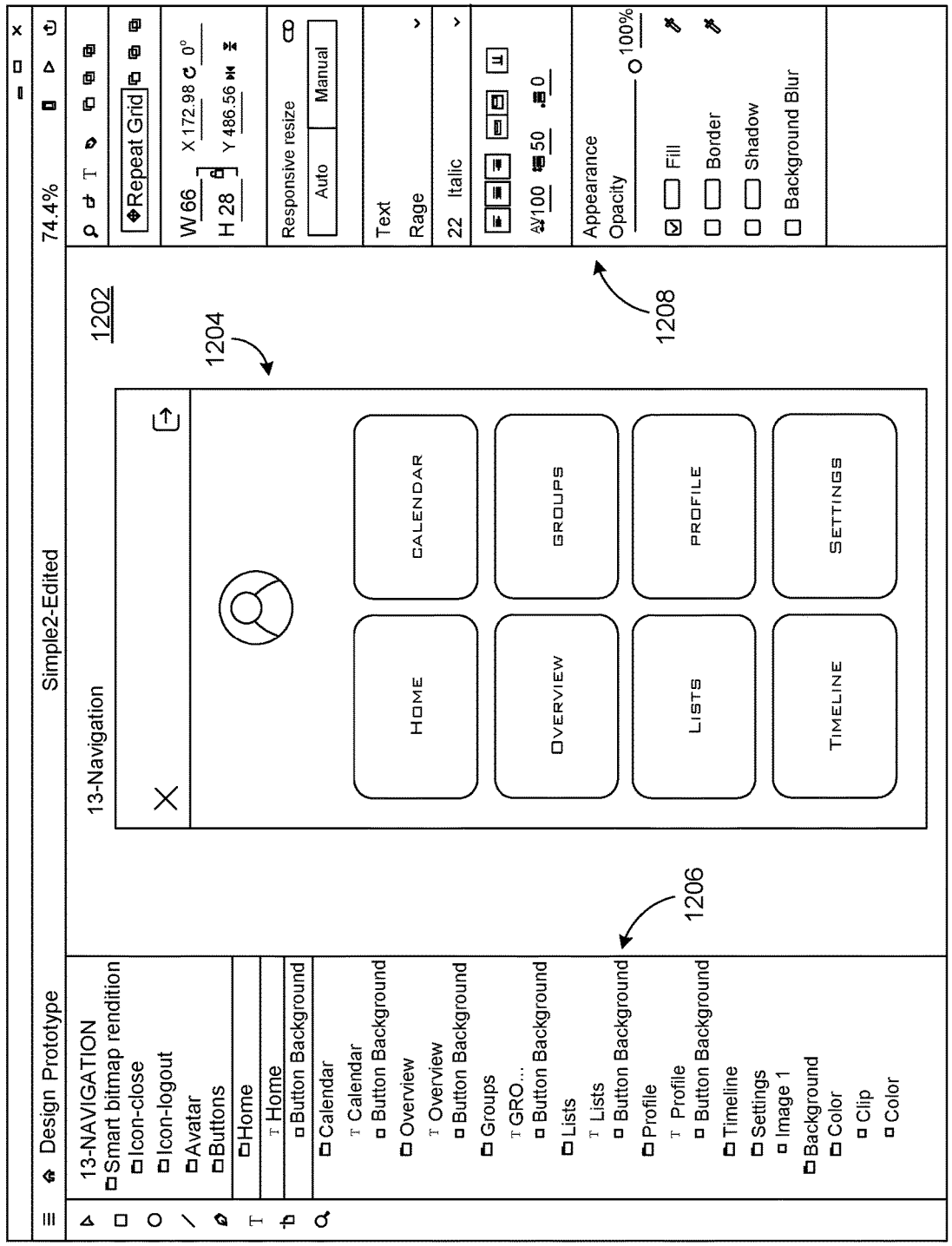
FIG. 12 is a first example screenshot of a target application of FIG. 1.

FIG. 12 is a first example screenshot of the target GUI 118 of FIG. 1. In the example of FIG. 12, the digital image of the navigation screen 1104 of FIG. 11 has been imported into the target application 108, and is displayed within a target canvas 1202, corresponding to a target canvas 128 of FIG. 1. In the example, the image of the navigation screen 1204 should thus be understood to correspond to the imported data asset 130 of FIG. 1. As such, and as may be understood from the preceding discussion, it will be appreciated that the various buttons and other content of the navigation screen image 1204 each include the types of rectangular bounding boxes, hotspots, or functionality retention object (such as the FRO 142 of FIG. 1) previously described.

Although these are transparent and not explicitly visible in the example of FIG. 12, a target metadata panel 1206 corresponding to the target metadata panel 134 includes an object hierarchy of virtual nodes representing the various transparent hotspots of the imported data asset 1204, within the target metadata panel 1206. In other words, the object hierarchy of virtual nodes 1210 represents an example of the virtual metadata 136 of FIG. 1. Thus, the object hierarchy of virtual nodes 1210 identifies the imported data asset 1204 as a smart bitmap rendition, in which individual elements are individually identified, including the various buttons, avatar, and background elements illustrated in the example of the navigation screen 1204.

Further in FIG. 12, another portion or example of a target metadata panel 1208 is illustrated, which provides available editing functionalities of the target application 108. In other words, various native editing functionalities are illustrated, corresponding generally to the target application tools 140 of FIG. 1. As described above, however, it is not necessary that such editing functions are applicable to the various elements of the navigation screen 1204, which, in the example, is a rasterized bitmap presentation. Nonetheless, the various editing features of the panel 1208 continue to be available to other editable assets within the target canvas 128, (e.g., represented by the target asset 132 in the example of FIG. 1).

Figure 13:
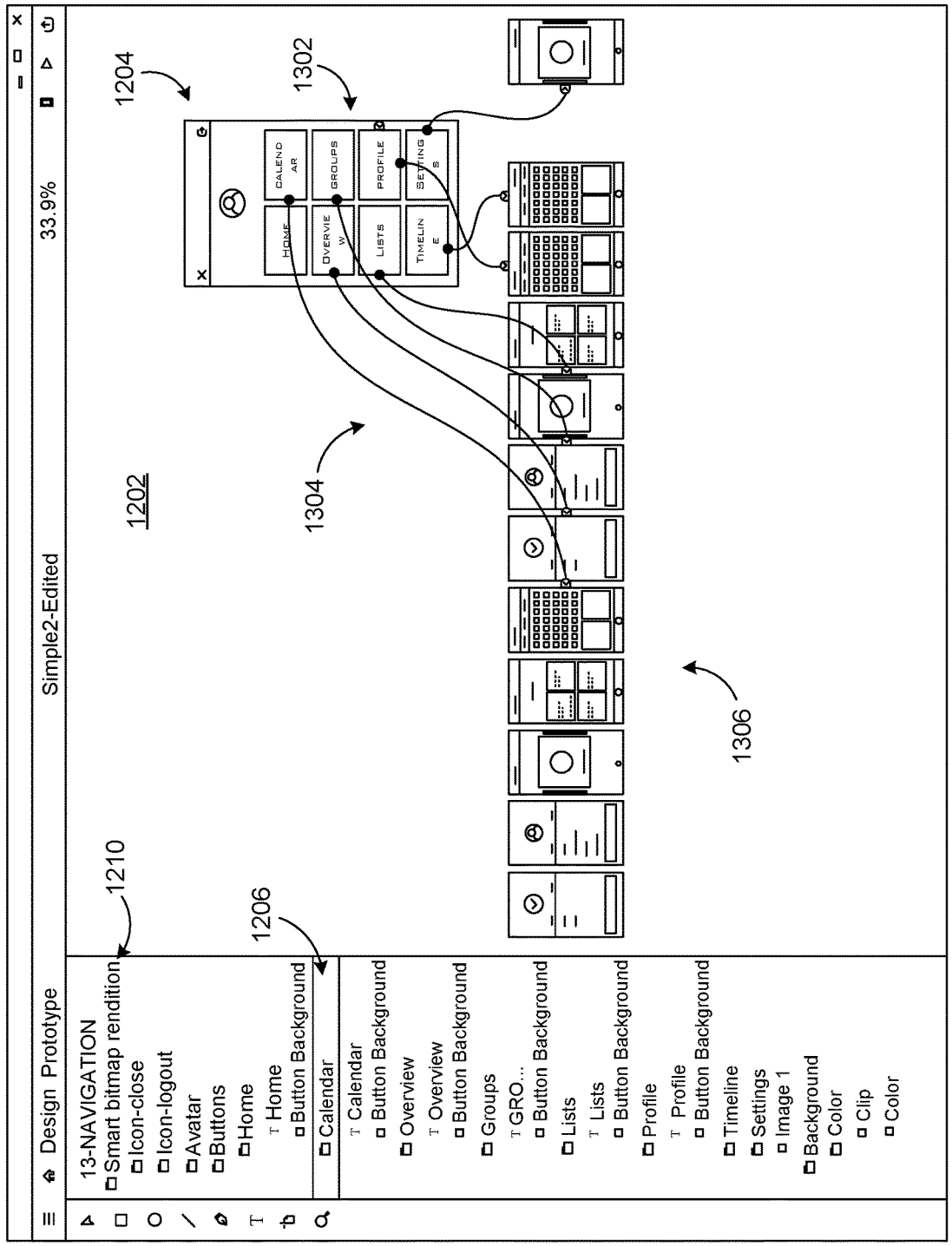
FIG. 13 is a second example screenshot of the target application of FIG. 1.

In FIG. 12, and as illustrated and described explicitly with respect to FIG. 13, the object hierarchy of virtual nodes 1210 nonetheless enables individual use of the various elements of the navigation screen 1204 in implementing native functionalities of the target application 108. Specifically, as shown in the example screenshot of FIG. 13, the target canvas 1202 may be utilized to display the imported navigation screen 1204 as shown, the individual buttons 1302 of the navigation screen 1204 may each be individually connected, using a corresponding plurality of connectors 1304, to other, individual screenshots from along a plurality of available screenshots 1306.

As already described, any button or other element within the imported navigation screen 1204 that is clicked on by the user will correspondingly be highlighted within the object hierarchy of virtual nodes 1210. Conversely, any virtual node within the object hierarchy of virtual nodes 1210 that is highlighted will cause a corresponding element of the imported navigation screen 1204 to be highlighted, as well.

Figure 14:
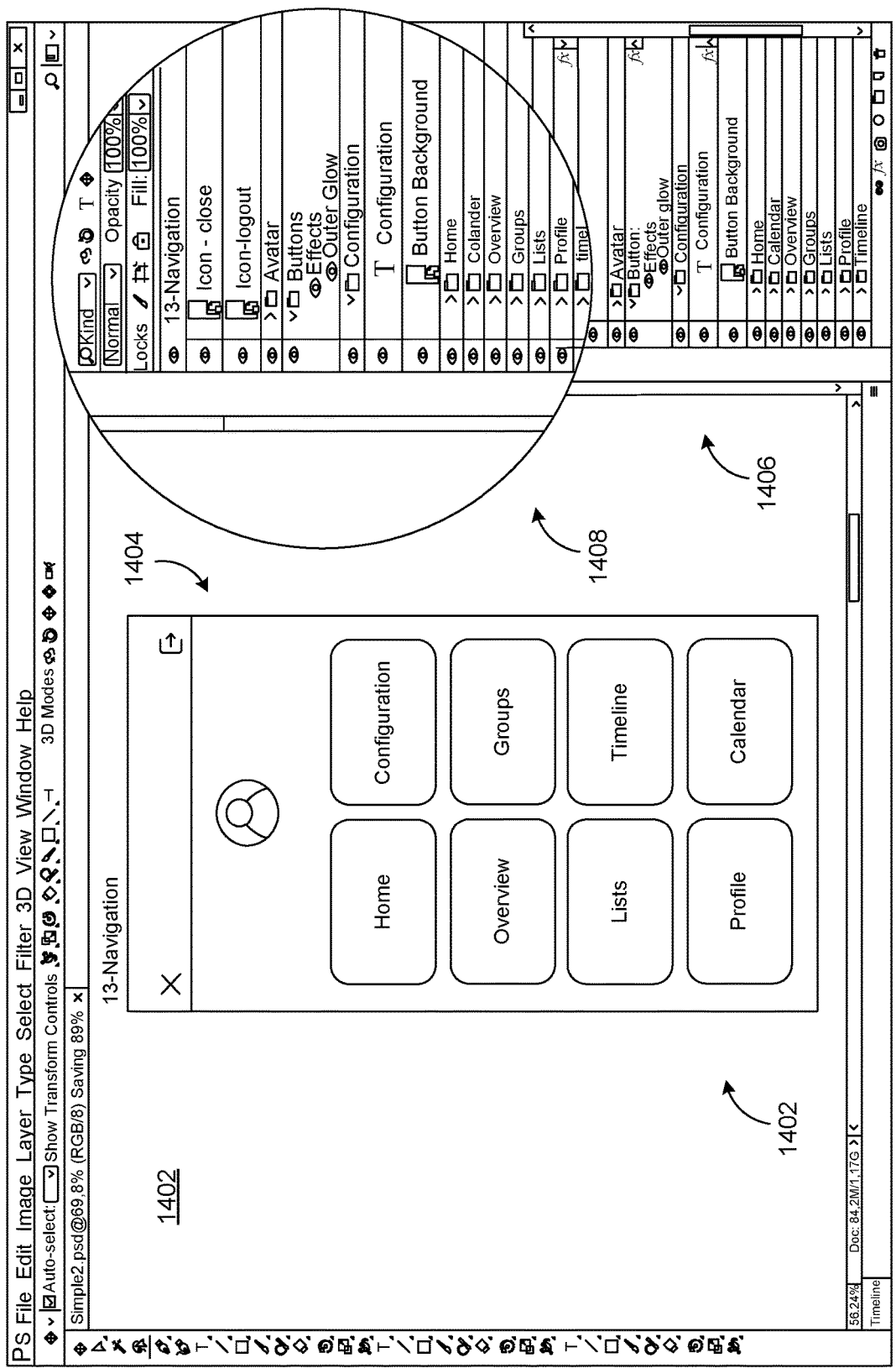
FIG. 14 is a second example screenshot of the source application of FIG. 1.

FIG. 14 is a second example screenshot of the source GUI 116, corresponding to the example screenshot of FIG. 11. In the example of FIG. 14, the user utilizes the editing functionalities of the source metadata panel 1106 to make edits to the navigation screen 1104. Specifically, as shown, the user may change the "settings" button to "configuration," and move the new "configuration" button to the first row, while swapping the "timeline" and "profile" buttons, and also changing the font of all the buttons to a preferred font.

Figure 15:
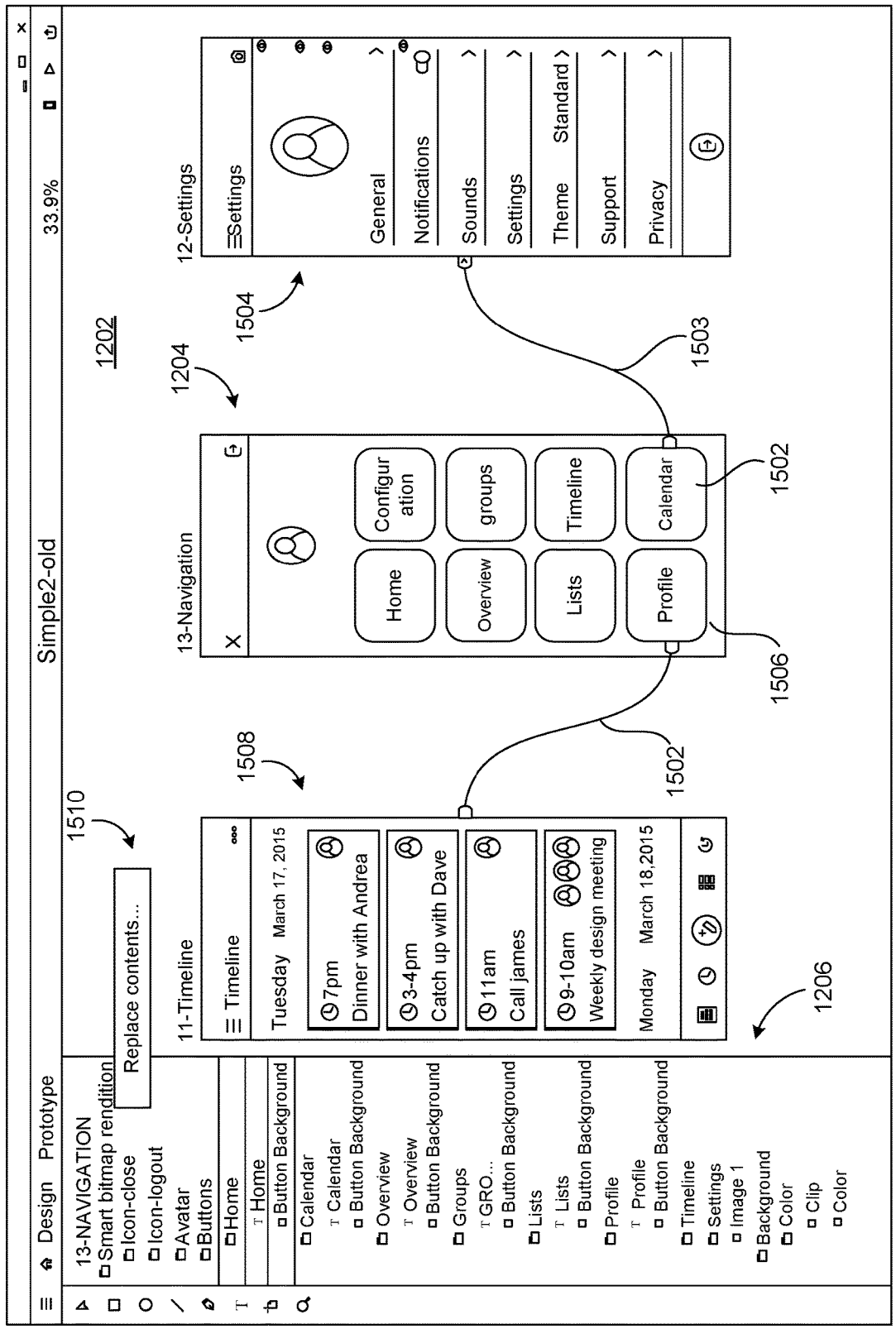
FIG. 15 is a third example screenshot of the target application of FIG. 1.

FIG. 15 is an example screenshot of the target canvas 128 of FIG. 1, corresponding to the target canvas 1202 of FIG. 12 and FIG. 13, which provides a blown up or magnified view of the screenshot of FIG. 13. In the example, the user has completed the changes just described with respect to FIG. 14 within the source application 106, and wishes to import the thus-modified navigation screen of FIG. 14 to the target application 108, without losing the benefit of the various connectors 1304 of FIG. 13 that have already been implemented.

Consequently, as shown in FIG. 15, the user may select the top node of the object hierarchy of virtual nodes 1206, identified as the "smart bitmap rendition." Specifically, the user right-clicks the top node of the object hierarchy 1206, and obtains a popup window 1510 with an option to "replace contents." In some implementations, the replace contents option of the popup window 1510 allows the user to browse from any available file of the source application 106, and is not necessarily tied to a filename of the navigation screen 1204. In other example implementations, it would be possible to tie the replacement contents with the original file of the navigation screen 1204.

In the example of FIG. 15, the settings button 1502 is connected by a connector 1503 to a settings screen 1504. The timeline button 1506 is connected by a connector 1507 to a timeline screen 1508.

Figure 16:
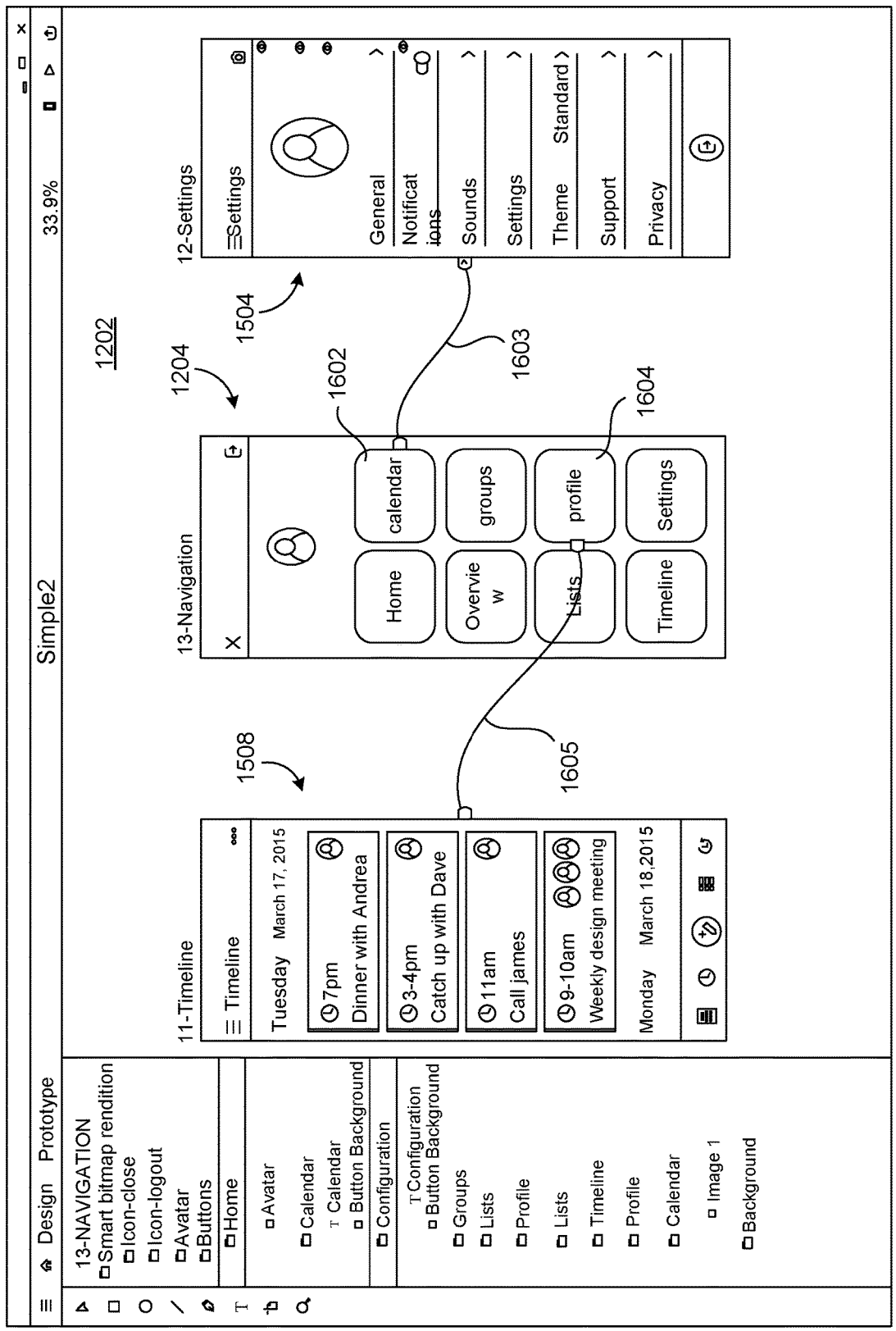
FIG. 16 is a fourth example screenshot of the target application of FIG. 1.

Then, in FIG. 16, the user has completed the importation of the updated navigation screen of FIG. 14. In other words, the navigation screen 1204 in FIG. 16 now includes the updated button placement and content, including the updated font, described above with respect to FIG. 14. Notwithstanding these changes, the conversion manager 101 of FIG. 1, as described with respect to FIGS. 1 and 3, may be configured to automatically update the various connectors 1503, 1505, 1507 of FIG. 15.

Specifically, as shown, the configuration button 1602, corresponding to the settings button 1502 of FIG. 15, remains connected to the settings screen 1504, by a connector 1603. Similarly, the timeline button 1604 in FIG. 16 is connected by connector 1605 to the timeline screen 1508. Various other buttons, or other elements, and their respective connectors, may also be updated automatically.

It will be appreciated from the above discussion that the update processes just described with respect to the examples of FIGS. 14-16 may be enabled by, e.g., the metadata mapping engine 154 of FIG. 1 and its included hashing engine 156, or, similarly, by the hasher 318 of FIG. 3. In other words, in the first import instance of FIGS. 11-13, a unique hash identifier may be assigned to each of the hotspots overlaying each of the individual elements of the navigation screen 1104 (e.g., to each of the various buttons). Then, in following the various updates to the navigation screen 1102 illustrated in the example of FIG. 14, the hasher may assign hashed identifiers to each of the various buttons again.

Consequently, when the updated navigation screen is imported into the target application in FIG. 16, the metadata mapping engine 154 of FIG. 1 may simply match the hashed identifiers from the two different import processes, to thereby determine equivalency of each pair of buttons. That is, for example, the metadata mapping engine 154 may thus determine that the configuration button 1602 underwent a change in both its name and position during the second import process, to thus update the connector 1503 and obtain the connectors 1603, so that the settings screen 1504 retains the desired connectivity of the prototype in question.

Figure 17:
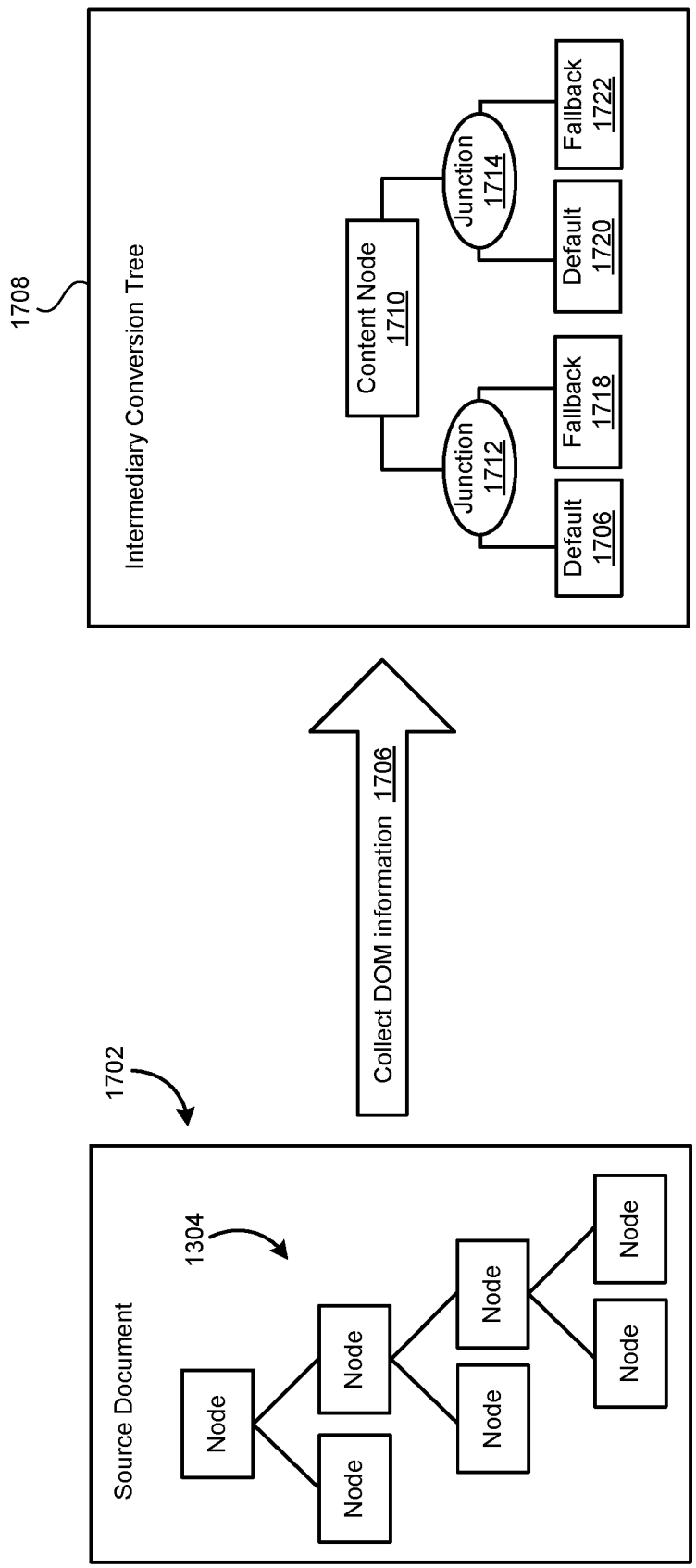
FIG. 17 is a block diagram illustrating a more detailed example implementation of the conversion process of FIG. 5.

FIG. 17 is a block diagram illustrating more detailed examples of the conversion process of FIG. 5. As described with respect to FIG. 5, such conversion processes generally begin with a source document 1702 that includes an object hierarchy of nodes 1704. In FIG. 17, it is further assumed a library is available that provides access a source DOM of the source document 1702, as an example of part of the parser 146 of FIG. 1, or the parser 304 of FIG. 3. Specifically, such a specialized library may provide the capability of rasterizing specific nodes or groups of nodes to maintain visual fidelity, in addition to any existing conversions that may be available for preserving editing fidelity (i.e., based on available functionalities of a given target application).

Through such DOM collection 1706, an intermediary conversion tree 1708 may be constructed. For purposes of the intermediary conversion tree 1708, the source document 1702 is parsed, and information about each of the node 1704 is collected. In particular, such information may be collected without regard for whatever capabilities may exist in a given target application. In other words, the intermediary conversion tree 1708 may be constructed independently of any specific target application.

In the intermediary conversion tree 1708, and with reference to the example node 402 of FIG. 4, all available common layer attributes 404 and specialized layer attributes 406 may be collected. Then, as shown in FIG. 17, the intermediary conversion tree 1708 may include a content node 1710, which is connected to a junction node 1712 and a junction node 1714. As further illustrated, the junction node 1712 is connected to a default node 1716 and a fallback node 1718, while the junction node 1714 is connected to a default node 1720 and a fallback node 1722.

It will be appreciated in FIG. 17 that the intermediary conversion tree 1708 represents only a portion of the node 1704 of the source document 1702, for purposes of brevity and clarity. The intermediary conversion tree 1708 represents that some or all of the nodes 1704 may be included with at least two options for conversion thereof. For example, the default node 1716 and the fallback node 1718 of the intermediary conversion tree 1708 may both correspond to a particular node of the nodes 1704, so that, during a subsequent generation phase in which a resulting target document is generated, multiple options will exist for generating the content of that particular node.

In other words, conceptually, the junction node(s) 1712, 1714, and their respective children 1716-1722, represent decision nodes that allow specific content/sub-trees and the source document 1702 to be converted using various strategies, e.g., to thereby obtain different grades of stability in potential target documents to be generated for corresponding target applications. In practice, multiple fallback nodes may be included for each junction node, and all children nodes of a particular junction node may be sorted or prioritized using one of a plurality of available sorting techniques.

For example, children nodes of junction nodes may be sorted according to editing fidelity loss value, visual fidelity loss value, or other criteria. For example, in some implementations, nodes that are easier to edit and have more semantic value may be assigned precedence over those that resemble their appearance within the source document 1702 more closely. For example, text elements with advanced typographical features in the source document 1702 may be converted to a simpler form in the target document, thus sacrificing appearance while preserving an original raw text stream. As described below, an optional feedback phase allows users to override the assigned sorting or priority order.

In other examples, sorting based on editing fidelity loss may not be preferable. For example, visual fidelity loss may be higher than a certain acceptable threshold, so that using a different type of content node results in a better conversion. For example, text on pass and vertical text elements in Adobe Photoshop® cannot be properly represented in Adobe XD®, and may be converted instead to horizontal text layers. In such scenarios, outlines or rasterizations may be preferred.

In FIG. 17, the various content nodes may be understood to generate a certain type of element within a target document to be generated. For example, in the case of converting Adobe Photoshop® to Adobe XD®, there may be text, shape, group, image, and other types of content nodes. These nodes may also contain or represent any types of fidelity loss that may be incurred in the target document, based on any specialized attributes that may be unable to be represented.

In FIG. 17, the junction nodes 1712, 1714 have no semantic value, but rather are used as content node selectors during subsequent generation phases (and user feedback phases) in which target documents are created and modified. In some implementations, a given junction node must have at least one content node as a child node, while a given content node may have zero or more junction node children.

The content nodes in the example of FIG. 17 should be understood to be particularly efficient, because any resource-consuming generation processes are delayed until actually required. For example, a node that rasterizes a sub-tree in an original document will initially store just the information needed to create the rasterized bitmap (e.g., a layer range within the source document), without creating and storing the entire bitmap (until if and when such a bitmap is actually required)).

Figure 18:
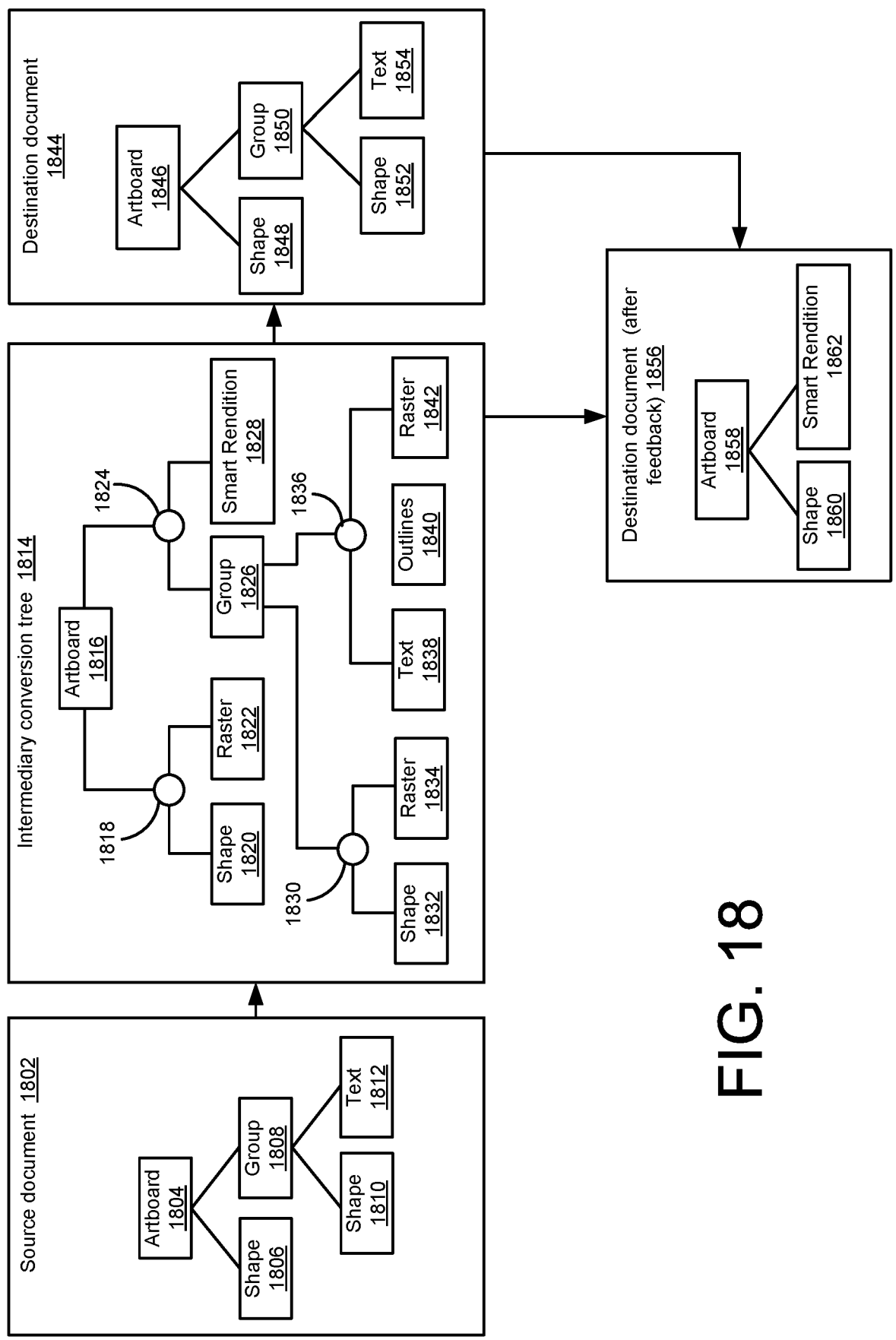
FIG. 18 is a more detailed example implementation of the conversion process of FIG. 17.

FIG. 18 is a block diagram of a more detailed example implementation of the conversion processes of FIGS. 5 and 17. In the example of FIG. 18, a source document 1802 includes an art board node 1804, a shape node 1806, and a group node 1808. The group node 1808 further includes a shape node 1810 and a text node 1812.

A subsequent intermediary conversion tree 1814 thus includes an art board node 1816 corresponding to the art board node 1804. A junction node 1818 provides an optional shape node 1820 corresponding to the shape node 1806, and a raster node 1822, corresponding to a rasterized bitmap of the shape node 1806. Similarly, a junction node 1824 is connected to a group node 1826 that corresponds to the group node 1808, as well as to a smart rendition node 1828 representing a rendition, such as a rasterized bitmap, of the group node 1808, having the various features described herein of a smart rendition (e.g., smart bitmap).

In other words, the smart rendition node 1828 of FIG. 18 provides an example of the techniques described above with respect to FIGS. 1-17, in that the group node 1826 may be represented in any subsequent destination document in conjunction with the type of generated hotspot described above, so that native functionalities of the target application may be retained with respect thereto. Thus, FIG. 18 demonstrates, as referenced with respect to FIG. 5, that the smart rendition techniques described herein may be implemented individually with respect to one or more nodes of the source document, in a highly efficient and customizable manner, and in the context of a larger conversion process.

The group node 1826 of the intermediary conversion tree 1814 further includes a junction node 1830 with a shape node 1832 corresponding to the shape node 1810, as well as a raster node 1834 corresponding to a rasterized version of the shape node 1810. Further, the group node 1826 includes a second junction node 1836 with a text node 1838 corresponding to the text node 1812, while also providing a fallback option of an outlines node 1840 for representing the text 1812/1838. The junction node 1836 also includes a raster node 1842.

FIG. 18 further demonstrates example generation and feedback phases that may be implemented with respect to the intermediary conversion tree 1814. Specifically, as shown, an initial generation phase applied to the intermediary conversion tree 1814 may result in a destination document 1844. As shown, the destination document 1844 retains the art board in node 1846, while also including the shape node 1848 corresponding to the shape node 1820. Further, the group node 1850 corresponds to the group node 1826, with the shape node 1852 corresponding to the shape node 1832, and the text 1854 corresponding to the text 1838. In other words, it may be observed that the example destination document 1844 initially attempts to retain maximum editing fidelity, by selecting the left-most option at each junction of the intermediary conversion tree 1814.

Nonetheless, in a given implementation, it may occur that the user determines that the group 1850 corresponding to the group node 1826 has experienced unacceptable losses in visual fidelity. Consequently, following a feedback process, an updated destination document 1856 may be produced. As shown, the user feedback has indicated that the art board 1858 and shape node 1860 may be retained, corresponding to the art board 1846 and a shape node 1848 of the original destination document 1844. However, the user feedback has indicated that the group 1850, corresponding to the group 1826, should be replaced by the smart bitmap rasterization of the node 1828, as indicated by updated smart rendition node 1862 within the updated destination document 1856.

Figure 19:
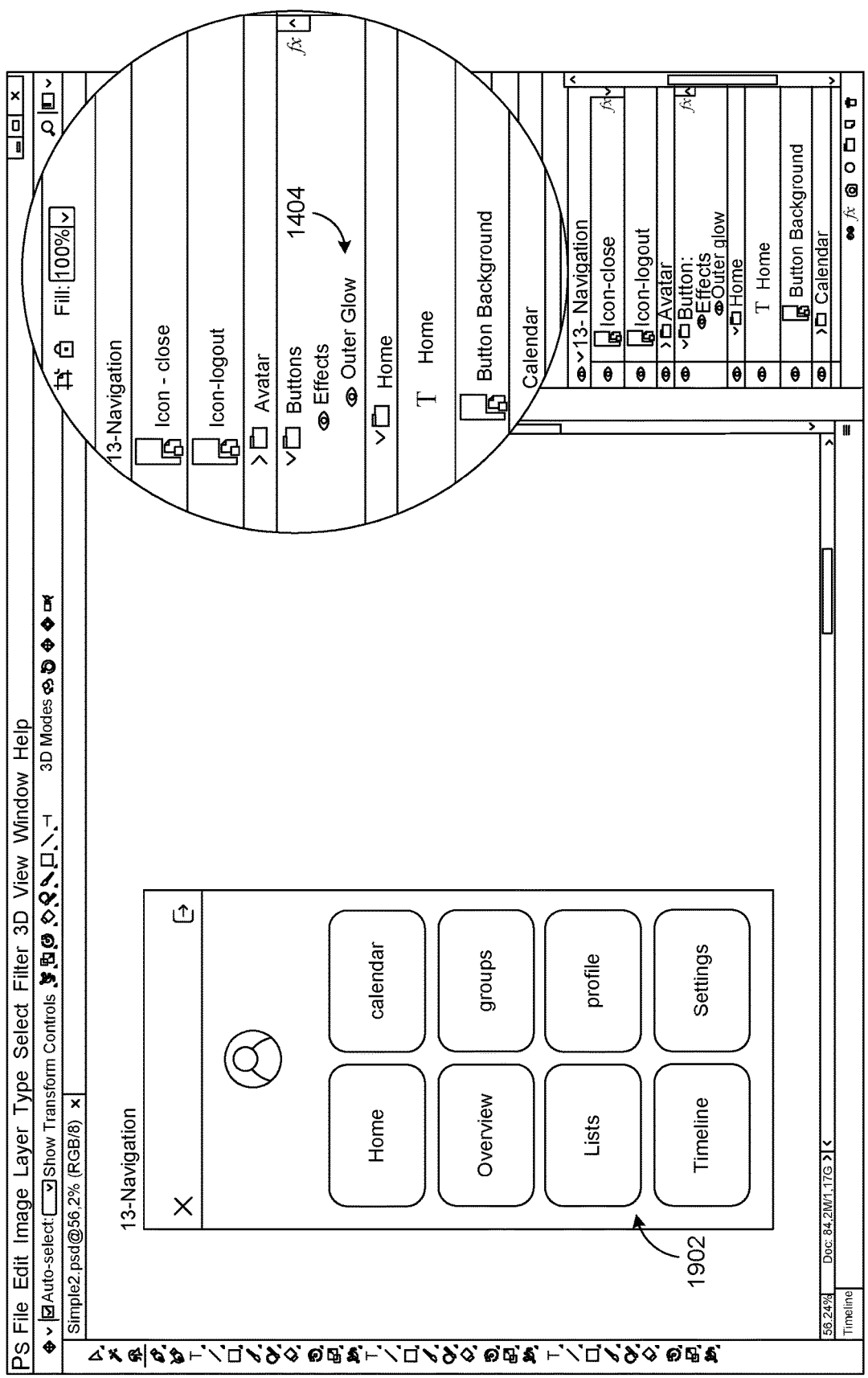
FIG. 19 is a first example screenshot of the conversion process of FIG. 18.
Figure 20:
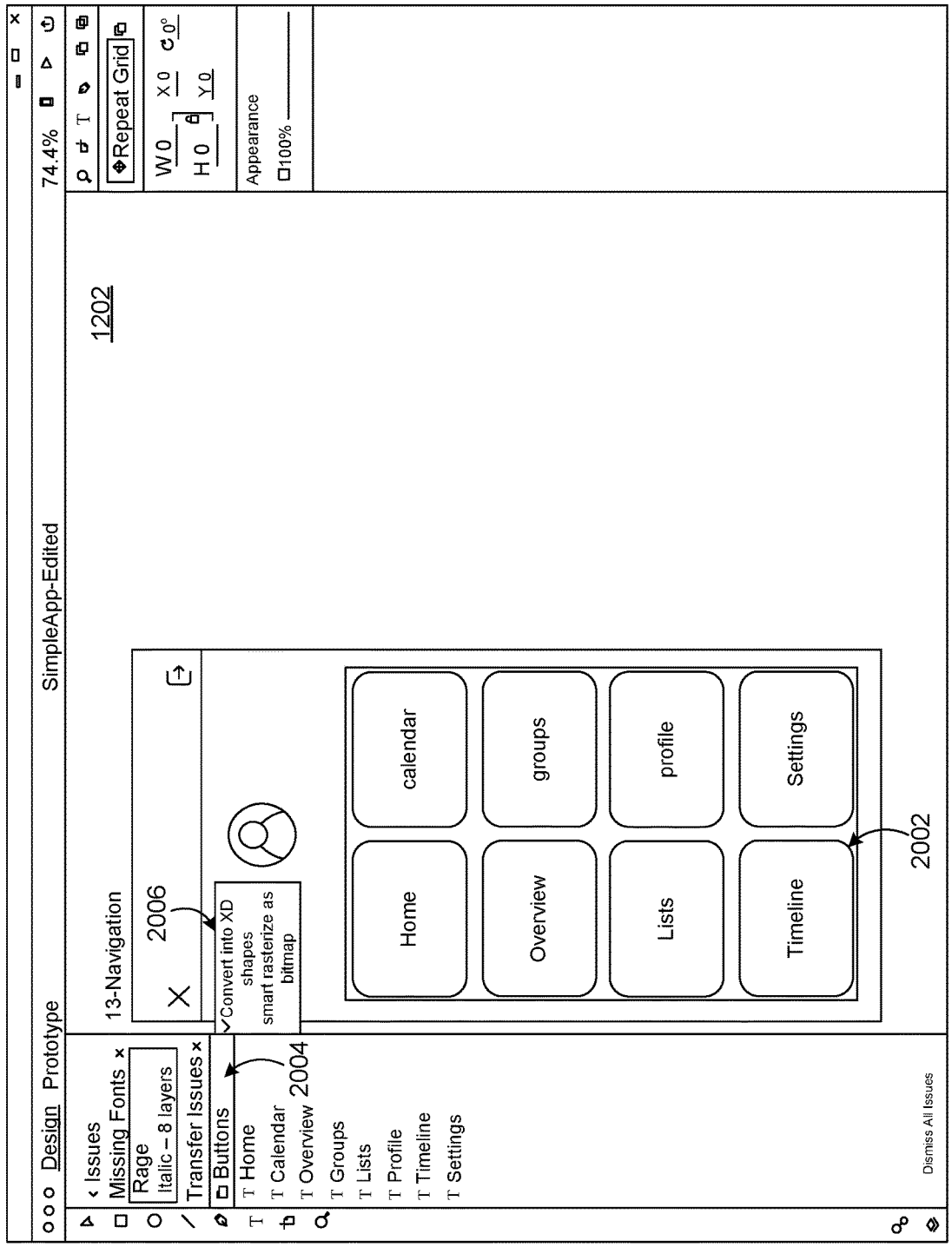
FIG. 20 is a second example screenshot of the conversion process of FIG. 18.

FIGS. 19 and 20 are screenshots illustrating example implementations of the conversion processes just described. In the example of FIG. 19, the source GUI is illustrated as including the navigation screen 1902, in which the various buttons of a navigation screen are shown to have an "outer glow" effect 1904.

Then, in FIG. 20, within the target GUI of the target application 108, it may occur that the "outer glow" effect is not supported. Consequently, an initial importation of the navigation screen 2002 in FIG. 20 may include a representation of the navigation screen buttons that does not include the "outer glow" effect. If the user determines that it is necessary or desirable to maintain the "outer glow" effect, then the user may proceed to enter the feedback phase described above by selecting the button's metadata 2004, and thereby obtaining popup window 2006, which provides an option for "smart rasterization as bitmap" for the selected buttons of the navigation screen 2002. In this way, it will be appreciated that the user may then proceed to utilize any individual one of the various buttons of the navigation screen 2002, such as for the connectivity operations described and illustrated above with respect to FIGS. 13 and 15, while still retaining the "outer glow" effect visually.

Figure 21:
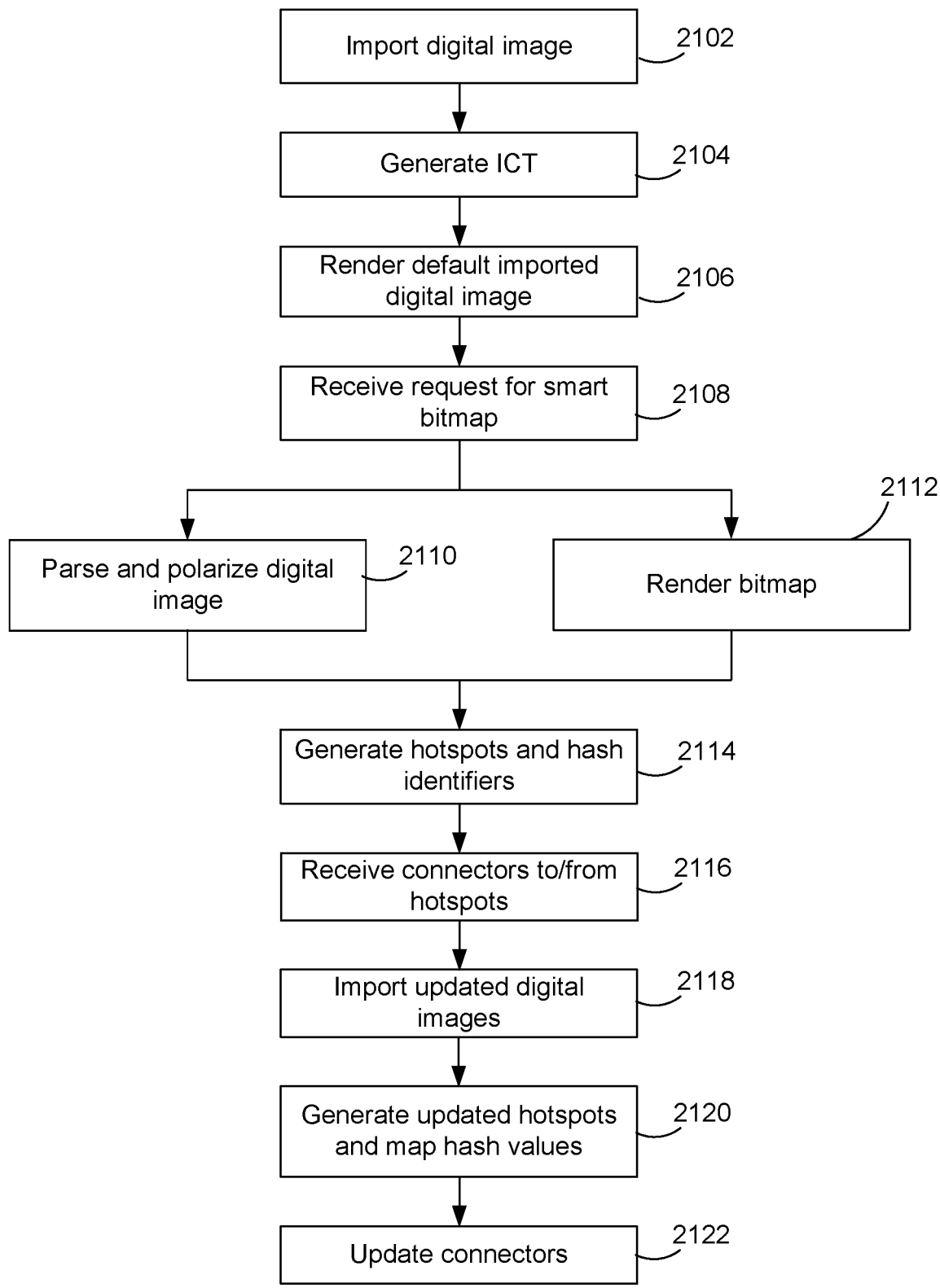
FIG. 21 is a flowchart illustrating more detailed example operations of the flowchart of FIG. 2, and corresponding to the examples of FIGS. 3-20.

FIG. 21 is a flowchart illustrating more detailed example implementations of the conversion processes of FIGS. 1-20. In FIG. 21, a digital image is imported from a source application (2102). An intermediary conversion tree is generated (2104), as described above with respect to FIGS. 17 and 18.

A default imported digital image is then rendered (2106) as described above with respect to the initial destination document 1844 of FIG. 18, or the initially-imported navigation screen 1902 of FIG. 19. As described with respect to FIG. 18 and illustrated with respect to FIG. 20, a request for a smart bitmap rasterization of a particular element may be received (2108).

The imported digital image may be parsed and planarized (2110), while a rasterized bitmap is also being rendered (2112). Hotspots and hash identifiers may then be generated for each identified element (2114). In this way, within the target application, various connectors to and/or from the generated hotspots may be received (2116).

With respect to the hash identifiers, as referenced above, it may be appreciated that users often desire to reimport some of the data assets after having further edited the assets in the source application 106. After an already-imported asset is adjusted in the source application 106 (or another application), the described techniques offer automatic reloading of the changes, while keeping the existing prototyping interactions that the user has created using the previous version of the artwork.

For instance, if the target application is Adobe XD® and the imported artwork is an Adobe Photoshop® document (.psd format) containing a panel with green buttons the user may add prototype interactions over the green buttons and then decide to change their color in Adobe Photoshop®. After saving the file in external application, the target application may automatically refresh the flat rendition and generate a new node hierarchy using the Planarizer. As described, in order to preserve the old prototype interactions, a mapping between the old hierarchy and the newly generated one is needed.

This mapping is provided, e.g., by the Hasher 318 of FIG. 3, which for each node in the hierarchy computes a unique identifier. The uniqueness constraint may thus be satisfied across file changes. Depending on the input format, the Hasher's complexity may vary. For some formats, such as Adobe Photoshop® documents (.psd extension) the Hasher may use the identifier of each layer that is obtained during parsing the file. In other scenarios, the Hasher 318 can generally be implemented, for example, using the formula:

$$h(\text{node}) = \begin{cases} d(0), \text{ if node is the root of the hierarchy} \\ \text{compose}(nodeInfo(\text{node}), h(\text{node.parent})), \text{ otherwise} \end{cases}$$

where $$nodeInfo(\text{node}) = \text{compose}(d(\text{node.type}), d(\text{node.parent.children.indexOf(node)}))$$

In the above, d is a general digest function (e.g., SHA2), node is the information provided by the Parser 304, and compose is a function that splices two digest results and its output is still in the digest format (e.g., SHA2(digestResult1, digestResult2)). Of course, other hashing techniques may also be used.

In such cases, where the originally-imported digital image is updated within the source application 106, as just referenced and as described with respect to FIGS. 14-16, then the updated digital image may be imported (2118). Accordingly, updated hotspots and hash values may be generated, so that the updated hash values may be mapped to the original hash identifiers of operation 2114.

In this way, as also described above with respect to FIGS. 14-16, individual elements of smart bitmaps may be correlated with one another between multiple import versions thereof. Accordingly, previously-designated connectors defined with respect to the original importation of the original digital image may be updated to be consistent with the updated importation of the updated digital image. Accordingly, functionalities of the target application, such as the described connectors, may be retained with respect to both a single conversion/importation of a digital image or other document, as well as across multiple updates thereto. In this way, the user may retain all the advantages of the various source application tools 138 within the source application 106, while efficiently utilizing the target application tools 140 of the target application 108.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method, the method comprising:

receiving a data asset of a source application, the data asset including an image element; parsing the data asset to determine asset metadata characterizing the data asset;

rendering a rendition of the data asset, including a rendition image element corresponding to an image element of the data asset;

determining a position of the image element within the data asset, based on the asset metadata by specifying a relative size of the image element and identifying a layer along a z-axis of the data asset in which the image element is included;

mapping a rendition image position of the rendition image element within the rendition to the position of the image element within the data asset;

generating a functionality retention object associated with retaining a functionality of a target application; and providing the functionality within the target application and with respect to the functionality retention object, including providing the functionality retention object over at least a portion of the rendition image element at the rendition image position.

2. The method of claim 1, further comprising:

generating virtual metadata relating the functionality retention object to the rendition image position; and representing the functionality retention within the virtual metadata.

3. The method of claim 1, wherein the generating the virtual metadata comprises:

generating the virtual metadata including a hierarchy of functionality retention objects corresponding to rendition image elements of the rendition, including the functionality retention object corresponding to the rendition image element.

4. The method of claim 1, further comprising:

displaying the functionality retention object over the rendition image element at the rendition image position within a canvas portion of a graphical user interface (GUI) of the target application; and displaying the virtual metadata within a panel of the GUI, including displaying a name for the functionality retention object identifying the rendition image element.

5. The method of claim 1, wherein the functionality retention object includes a bounding box that overlays the rendition image element at least partially transparently within a graphical user interface (GUI) of the target application.

6. A computer program product, the computer program product being tangibly embodied on a non-transitory computer-readable storage medium and comprising instructions that, when executed by at least one computing device, are configured to cause the at least one computing device to:

import a digital image into a target application providing a functionality with respect to digital images;

render the digital image to obtain a rendered digital image;

parse the digital image to obtain asset metadata characterizing the digital image;

generate position information identifying a position of an image element within the digital image;

generate a virtual layer;

overlay, using the position, the virtual layer onto a rendition image element of the rendered digital image corresponding to the image element, within a graphical user interface (GUI) of the target application; and generate a hierarchy of virtual nodes corresponding to virtual layers overlaid onto rendition image elements of the rendered digital image, including the virtual layer and the rendition image element;

provide the functionality within the GUI and with respect to the virtual layer, to thereby provide the appearance of providing the functionality with respect to the rendition image element.

7. The computer program product of claim 6, wherein the instructions, when executed, are further configured to cause the at least one computing device to:

provide the virtual layer as a transparent bounding box with borders enclosing the rendition image element; and generate virtual metadata including the hierarchy of virtual nodes.

8. A computer program product, the computer program product being tangibly embodied on a non-transitory computer-readable storage medium and comprising instructions that, when executed by at least one computing device, are configured to cause the at least one computing device to:

receive a data asset of a source application, the data asset including an image element;

parse the data asset to determine asset metadata characterizing the data asset;

render a rendition of the data asset, including a rendition image element corresponding to the image element of the data asset;

determine a position of the image element within the data asset, based on the asset metadata; map a rendition image position of the rendition image element within the rendition to the position of the image element within the data asset;

generate a hierarchy of functionality retention objects corresponding to rendition image elements of the rendition, including a functionality retention object associated with retaining a functionality of a target application; and provide the functionality within the target application and with respect to the functionality retention object, including providing the functionality retention object over at least a portion of the rendition image element at the rendition image position.

9. The computer program product of claim 8, wherein the instructions, when executed, are further configured to cause the at least one computing device to:

parse the data asset to determine the asset metadata including an object hierarchy of nodes, in which at least one node corresponds to the image element.

10. The computer program product of claim 8, wherein the instructions, when executed, are further configured to cause the at least one computing device to:

determine the position of the image element within the data asset, including specifying a relative size of the image element and identifying a layer along a z-axis of the data asset in which the image element is included.

11. The computer program product of claim 8, wherein the instructions, when executed, are further configured to cause the at least one computing device to:

generate virtual metadata relating the functionality retention object to the rendition image position; and represent the functionality retention within the virtual metadata.

12. The computer program product of claim 11, wherein the instructions, when executed, are further configured to cause the at least one computing device to:

generate the virtual metadata including the hierarchy of functionality retention objects.

13. The computer program product of claim 8, wherein the functionality retention object includes a bounding box that overlays the rendition image element at least partially transparently within a graphical user interface (GUI) of the target application.

display the functionality retention object over the rendition image element at the rendition image position within a canvas portion of a graphical user interface (GUI) of the target application; and display the virtual metadata within a panel of the GUI, including displaying a name for the functionality retention object identifying the rendition image element.

14. The computer program product of claim 8, wherein the functionality retention object includes a bounding box that overlays the rendition image element at least partially transparently within a graphical user interface (GUI) of the target application.

15. The computer program product of claim 8, wherein the target application includes a user experience design application, and further wherein the functionality of the target application includes connection of the rendition image element to a second image element of the target application for use in a user experience design.

16. The computer program product of claim 8, wherein the instructions, when executed, are further configured to cause the at least one computing device to
assign an identifier to the image element of the data asset; receive an updated version of the data asset; relate the updated version of the data asset to a corresponding, updated rendition image element, and to the functionality retention object, based on the identifier; and retain the functionality of the target application with respect to the updated rendition image element and the functionality retention object.

17. The computer program product of claim 16, wherein the instructions, when executed, are further configured to cause the at least one computing device to:
assign the identifier including applying a hash function to the image element to obtain a first hash identifier; apply the hash function to the updated image element to obtain a second hash identifier; and relate the updated version of the data asset including corresponding the first hash identifier and the second hash identifier.

18. The computer program product of claim 8, wherein the instructions, when executed, are further configured to cause the at least one computing device to:
convert the asset metadata into an intermediate conversion tree in which individual nodes of the asset metadata are each associated with a junction node, wherein each junction node includes at least two conversion options for converting a corresponding image element of the associated node of the junction node; and generate a destination file from the intermediate conversion tree, including selecting from among the at least two conversion options for each junction node.

19. The computer program product of claim 18, wherein at least one junction node corresponds to the image element, and includes at least one conversion option for generating the functionality retention object and the rendition image element.

* * * * *